(12) United States Patent
Hamasaki

(10) Patent No.: US 11,843,740 B2
(45) Date of Patent: Dec. 12, 2023

(54) IMAGE FORMING APPARATUS HAVING A WIRELESS COMMUNICATION MODULE

(71) Applicant: CANON KABUSHIKI KAISHA, Tokyo (JP)

(72) Inventor: Ryuji Hamasaki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/877,174

(22) Filed: Jul. 29, 2022

(65) Prior Publication Data

US 2023/0031321 A1 Feb. 2, 2023

(30) Foreign Application Priority Data

Aug. 2, 2021 (JP) ................. 2021-126656

(51) Int. Cl.
*H04N 1/00* (2006.01)
*H01Q 1/24* (2006.01)

(52) U.S. Cl.
CPC ........... *H04N 1/00559* (2013.01); *H01Q 1/24* (2013.01)

(58) Field of Classification Search
None
See application file for complete search history.

(56) References Cited

U.S. PATENT DOCUMENTS

| 6,900,774 B2 | 5/2005 | Kawakami et al. |
| 2004/0207564 A1* | 10/2004 | Kawakami ............... H01Q 1/52 343/702 |
| 2014/0146334 A1* | 5/2014 | Yuzawa ............... H04B 5/0031 358/1.15 |

FOREIGN PATENT DOCUMENTS

| JP | 2004106542 A | 4/2004 |
| JP | 2015196335 A | 11/2015 |
| JP | 2017211490 A | 11/2017 |
| JP | 2021053808 A | 4/2021 |

* cited by examiner

*Primary Examiner* — Andrew H Lam
(74) *Attorney, Agent, or Firm* — ROSSI, KIMMS & McDOWELL LLP

(57) ABSTRACT

An image forming apparatus including: an apparatus frame; an exterior cover configured to cover the apparatus frame; a wireless communication module including an antenna for wireless communication and a board on which the antenna is mounted, and disposed between the apparatus frame and the exterior cover; and a fixing unit configured to fix the wireless communication module to the exterior cover, and including a screw screwed into a screw hole disposed on the exterior cover via a hole disposed on the board; wherein the board has four sides including a first side near the antenna and a second side extending along the first side and distant from the antenna, and the hole is disposed at a position close to the second side.

14 Claims, 23 Drawing Sheets

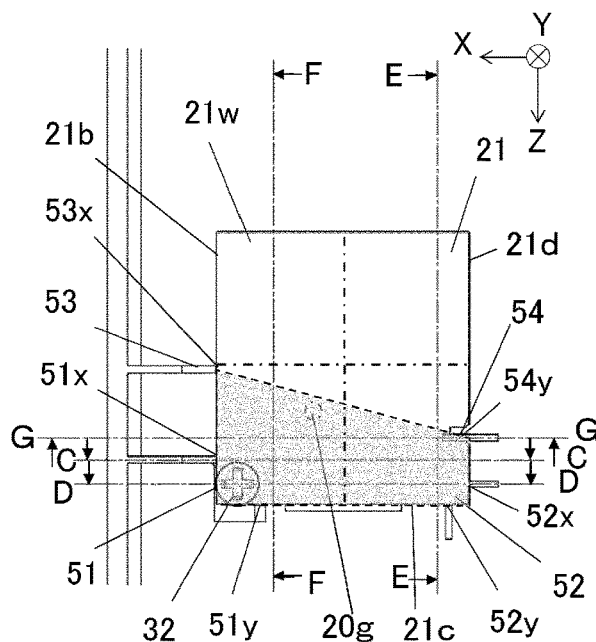
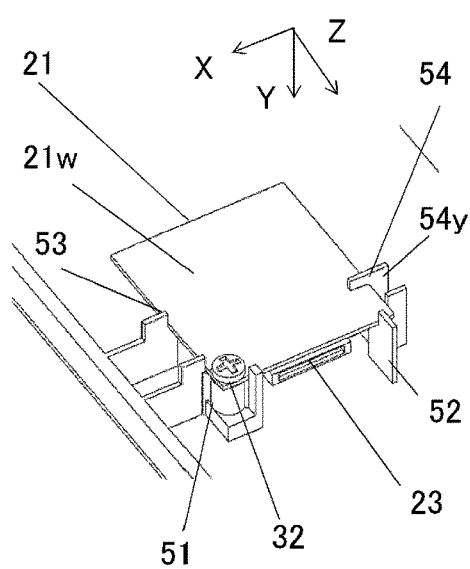
Fig.5A     Fig.5B
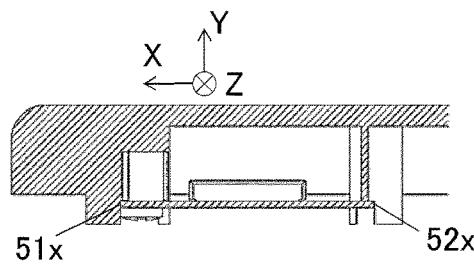
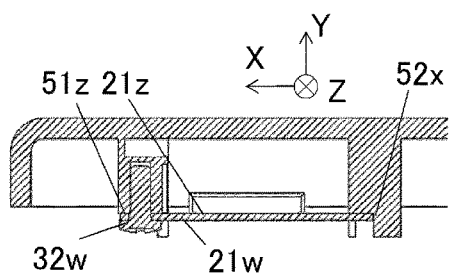
Fig.5C     Fig.5D
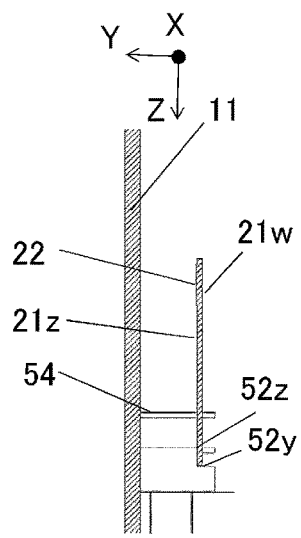 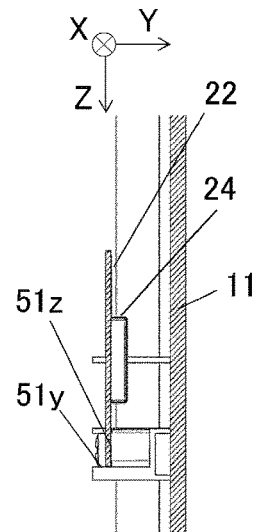 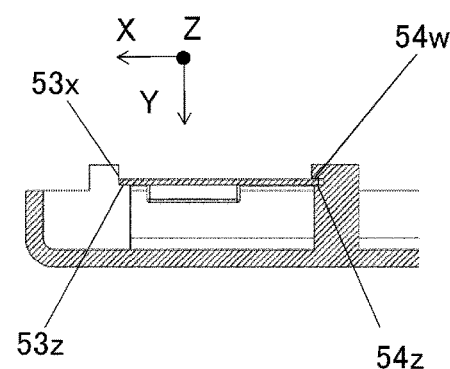
Fig.5E     Fig.5F     Fig.5G

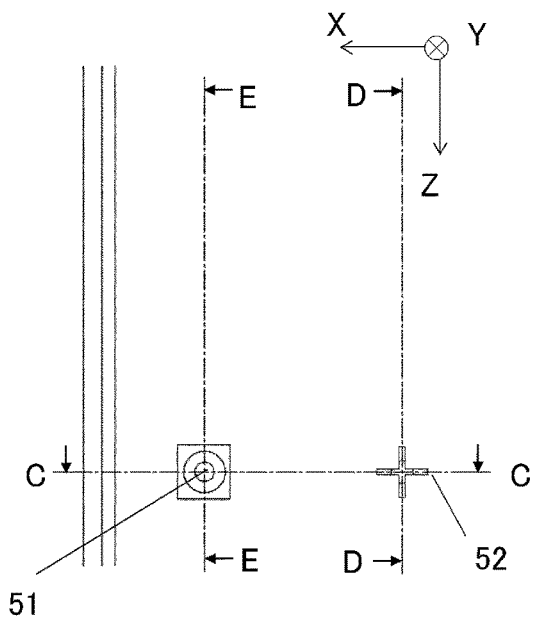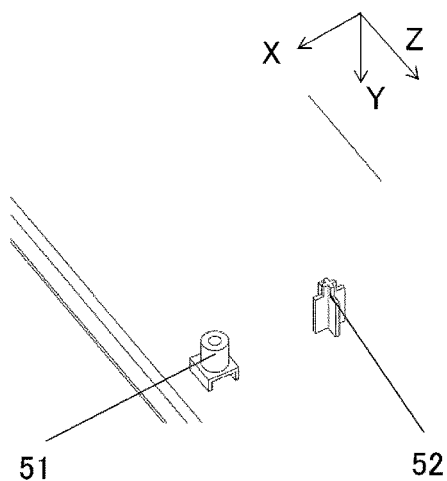
Fig.9A  Fig.9B
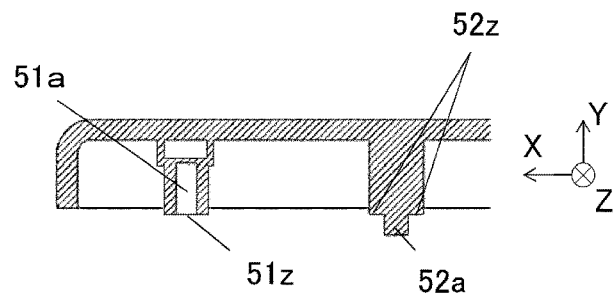
Fig.9C
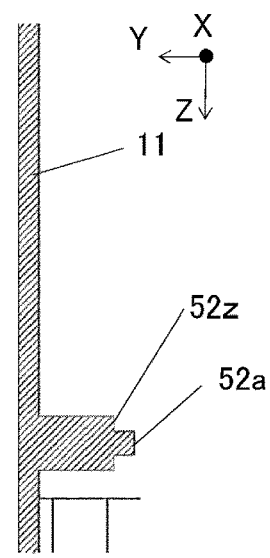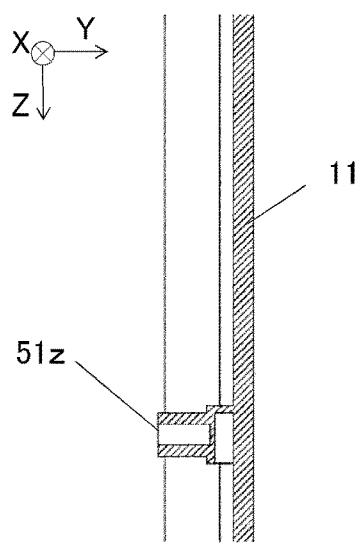
Fig.9D  Fig.9E

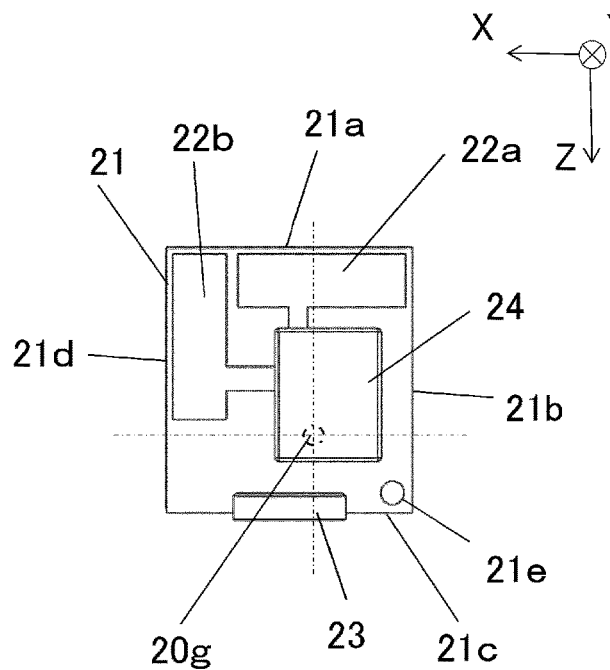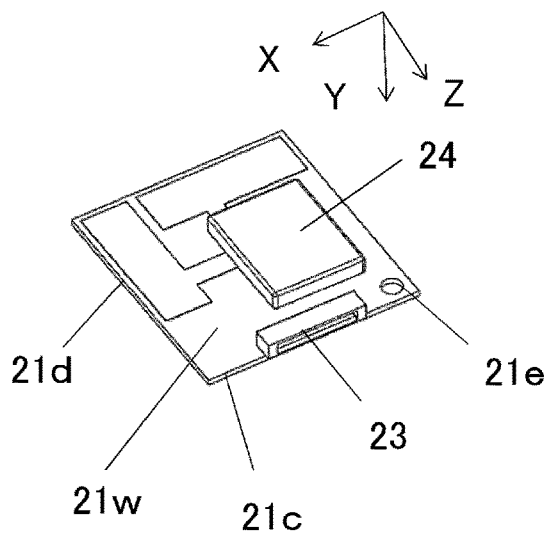
*Fig.13A*  *Fig.13B*
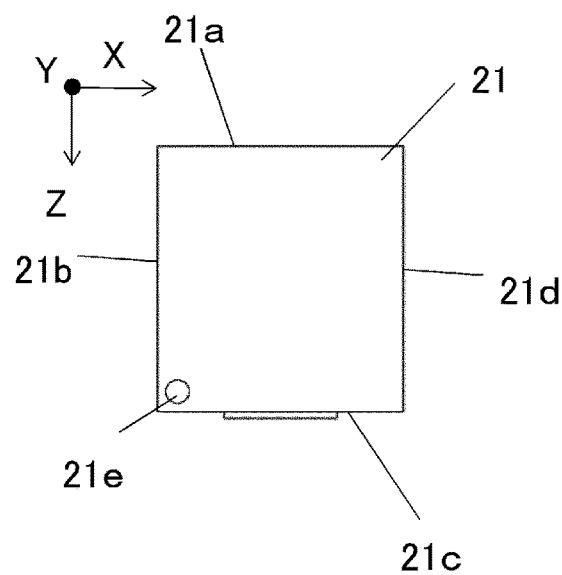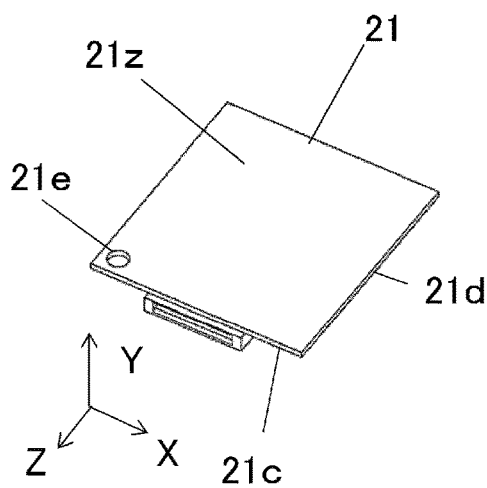
*Fig.13C*  *Fig.13D*

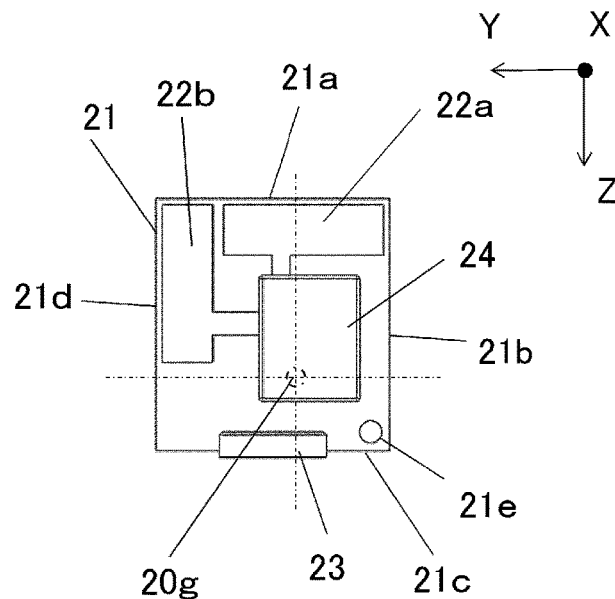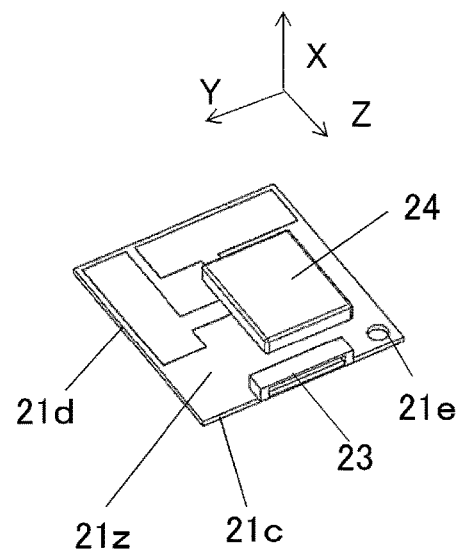
*Fig.19A*  *Fig.19B*
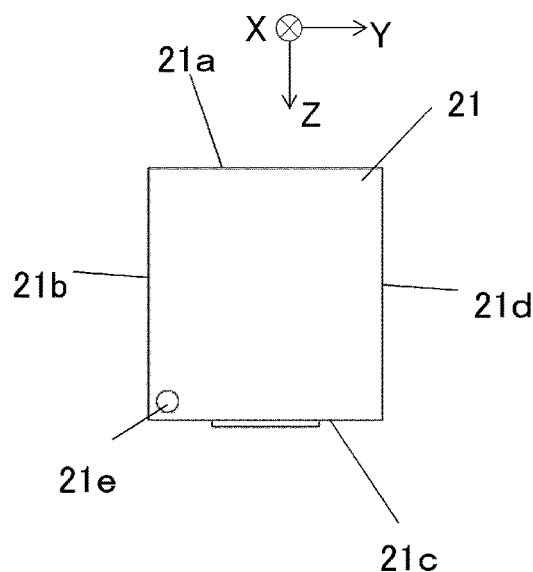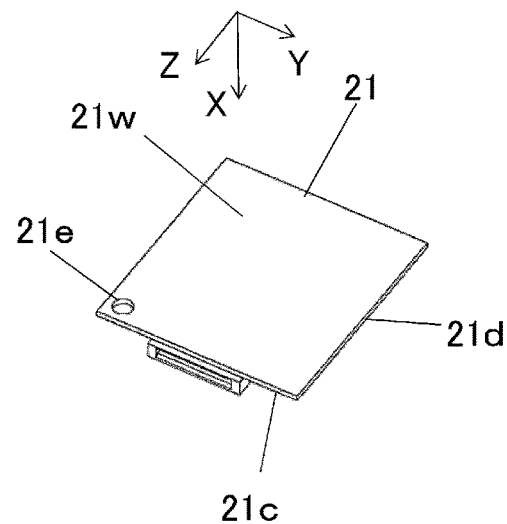
*Fig.19C*  *Fig.19D*

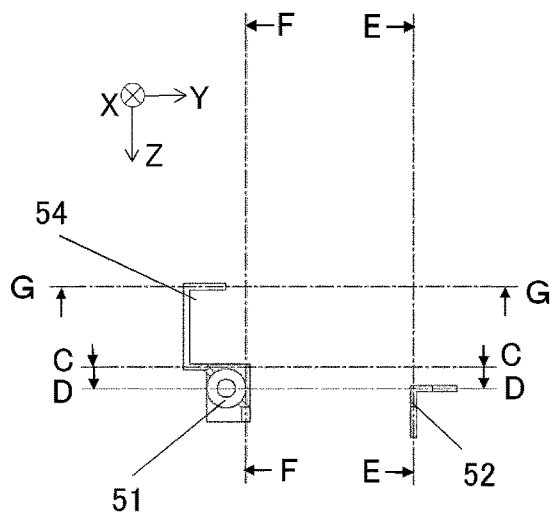
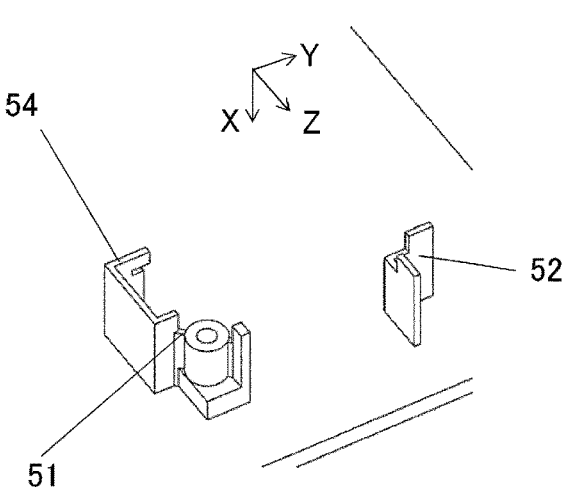
Fig.20A　　　　　　Fig.20B
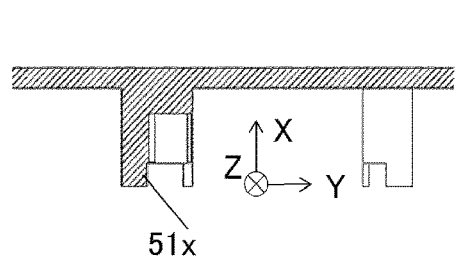
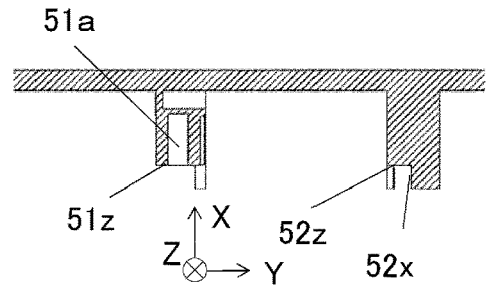
Fig.20C　　　　　　Fig.20D
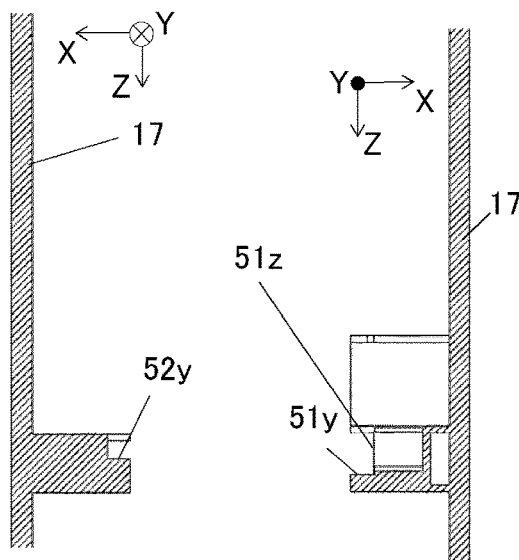
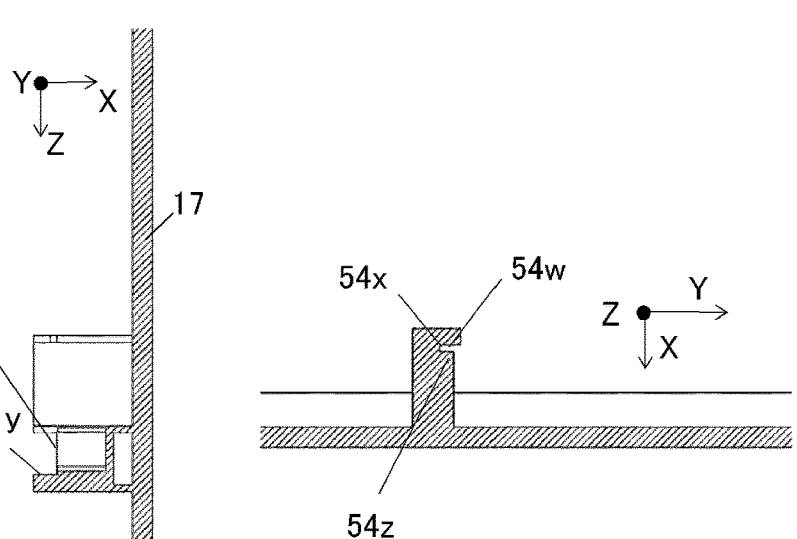
Fig.20E　　Fig.20F　　Fig.20G

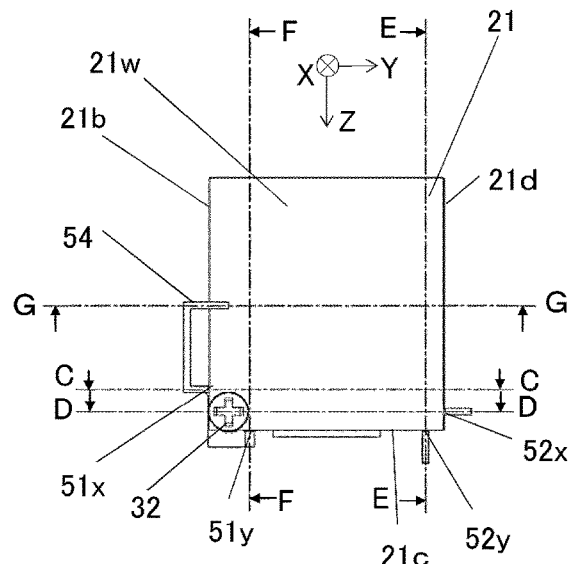
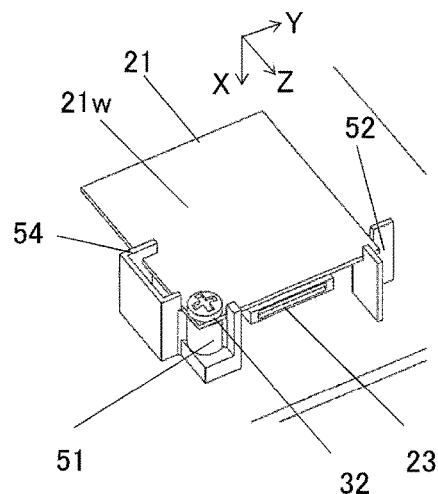
Fig.21A
Fig.21B
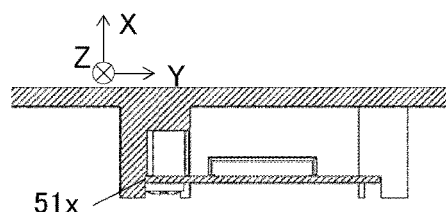
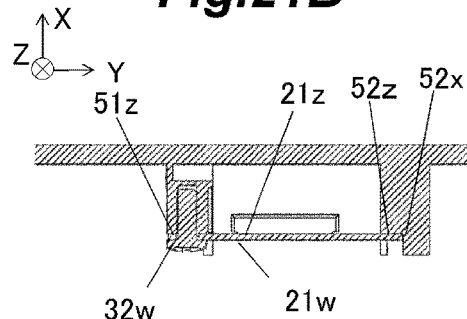
Fig.21C
Fig.21D
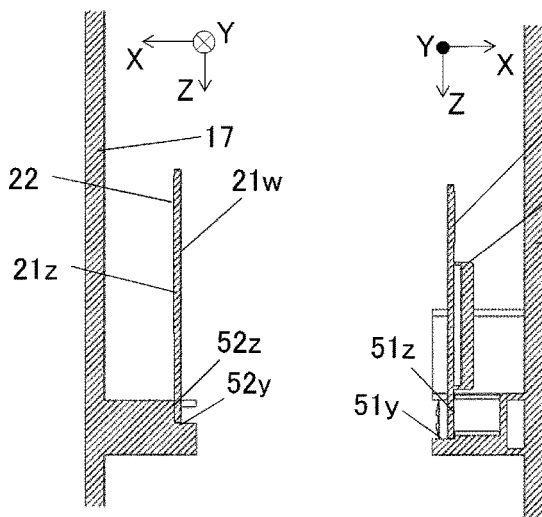
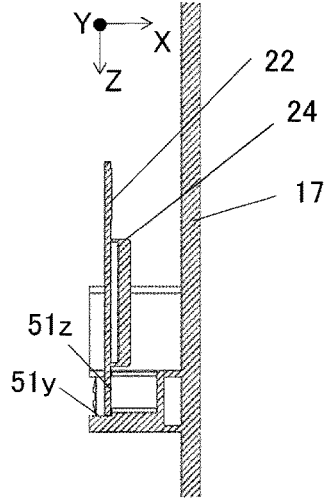
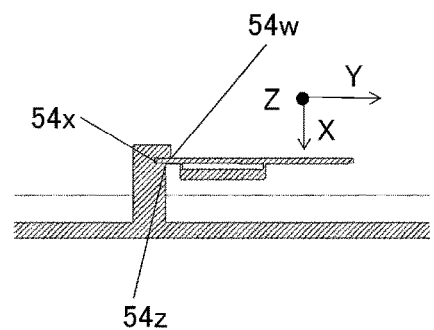
Fig.21E
Fig.21F
Fig.21G

IMAGE FORMING APPARATUS HAVING A WIRELESS COMMUNICATION MODULE

BACKGROUND OF THE INVENTION

Field of the Invention

The present invention relates to an image forming apparatus that forms an image on a recording medium.

Description of the Related Art

In recent years it is common for a laser printer (hereafter referred to as "image forming apparatus") to include a wireless communication unit, so that the user can instruct various operations, such as printing and settings, to the image forming apparatus in order to improve user friendliness. A wireless communication unit normally includes a wireless board which is independent from a control board, so as to control the wireless board by connecting the wireless board with the control board. Since communication performance is critical for the wireless board, it is preferable that the wireless board is disposed in a location close to outside in an apparatus, and has as few components as possible disposed near the wireless board that can disturb communication.

Japanese Patent Application Publication No. 2015-196335 discloses a configuration in which a control board and a wireless board are connected via a cable, and the wireless board is held at multiple points in a position close to an exterior cover and thereby enable good wireless communication performance.

SUMMARY OF THE INVENTION

A short-distance wireless communication such as NFC (near field communication) uses a frequency band (e.g. 13.56 MHz) that is insusceptible to obstacles, and a user holds a communication device and move it closer to a specific part of the image forming apparatus. Therefore, in the short-distance wireless communication, even if the wireless board is supported in the image forming apparatus at a plurality of locations in a manner that covers a wireless communication module provided in the image forming apparatus, communication is not disturbed unless an obstacle (e.g. metal plate) exists directly between the part which the communication device is moved closer to and an antenna of the wireless communication module. On the contrary, an intermediate distance wireless LAN communication such as Wi-Fi uses a frequency band (e.g. 2.4 GHz or 5 GHz) that is more susceptible to obstacles than the short-distance wireless communication, and positions of the communication destination is inconstant. Therefore, a holding member that holds the wireless module may disturb wireless communication if the holding member is positioned near an antenna for the wireless communication provided in the image forming apparatus.

With the foregoing in view, it is an object of the present invention to provide an image forming apparatus with good wireless communication performance.

An image forming apparatus according to the present invention comprises an apparatus frame;

an exterior cover configured to cover the apparatus frame;

a wireless communication module including an antenna for wireless communication and a board on which the antenna is mounted, and disposed between the apparatus frame and the exterior cover, and a fixing unit configured to fix the wireless communication module to the exterior cover, and including a screw screwed into a screw hole disposed on the exterior cover via a hole disposed on the board; wherein when viewed in a direction perpendicular to a mounting surface of the board on which the antenna is mounted, the antenna and the hole are disposed between a first side constituting a part of an outer form of the board and a second side that extends along the first side, the antenna is disposed at a position closer to the first side than to the second side, and the hole is disposed at a position closer to the second side than to the first side.

According to the present invention, an image forming apparatus with good wireless communication performance can be provided.

Further features of the present invention will become apparent from the following description of exemplary embodiments with reference to the attached drawings.

BRIEF DESCRIPTION OF THE DRAWINGS

FIGS. 5A to 5G are explanatory diagrams of the upper cover and the wireless LAN communication module in the installed state according to Embodiment 1;

FIGS. 9A to 9E are explanatory diagrams of an upper cover according to Embodiment 2;

FIGS. 13A to 13D are explanatory diagrams of a wireless LAN communication module according to Embodiment 3;

FIGS. 19A to 19D are explanatory diagrams of a wireless LAN communication module according to Embodiment 4;

FIGS. 20A to 20G are explanatory diagrams of a left front cover and a left rear cover according to Embodiment 4;

FIGS. 21A to 21G are explanatory diagrams of the left front cover and the wireless LAN communication module in an installed state according to Embodiment 4;

DESCRIPTION OF THE EMBODIMENTS

Embodiments of the present invention will now be described in detail using examples with reference to the drawings. The dimensions, materials and shapes of the components described in the embodiments and the relative positions thereof may be changed appropriately depending on a configuration of an apparatus to which the invention is applied, and on various conditions. In other words, the following embodiments are not intended to limit the scope of the invention.

Embodiment 1

In Embodiment 1, a case where the present invention is applied to a tandem (four-drum type) color laser beam printer, that can form full color images using an electrophotographic system, will be described. Application of the present invention is not limited to this, and the present invention is also applicable to copiers, printers and the like using an electrostatic recording system or ink jet recording system.

In the following description, directions are defined with respect to a user who is using the image forming apparatus 1. In other words, a front side (front face side) of the image forming apparatus 1 in use that the user is facing will be referred to as "front", a rear side (rear face side) thereof will be referred to as "back", an upper face side (top face side) will be referred to as "up", and a lower face side (bottom face side) will be referred to as "down". A left side (left face side) of the image forming apparatus 1 when viewed from the front face side will be referred to as "left", and the right side (right face side) thereof will be referred to as "right". It is also defined that front-back direction is Z direction, up-down direction is Y direction, and left-right direction is X direction.

(1) General Configuration of Image Forming Apparatus 1

Figure 23:
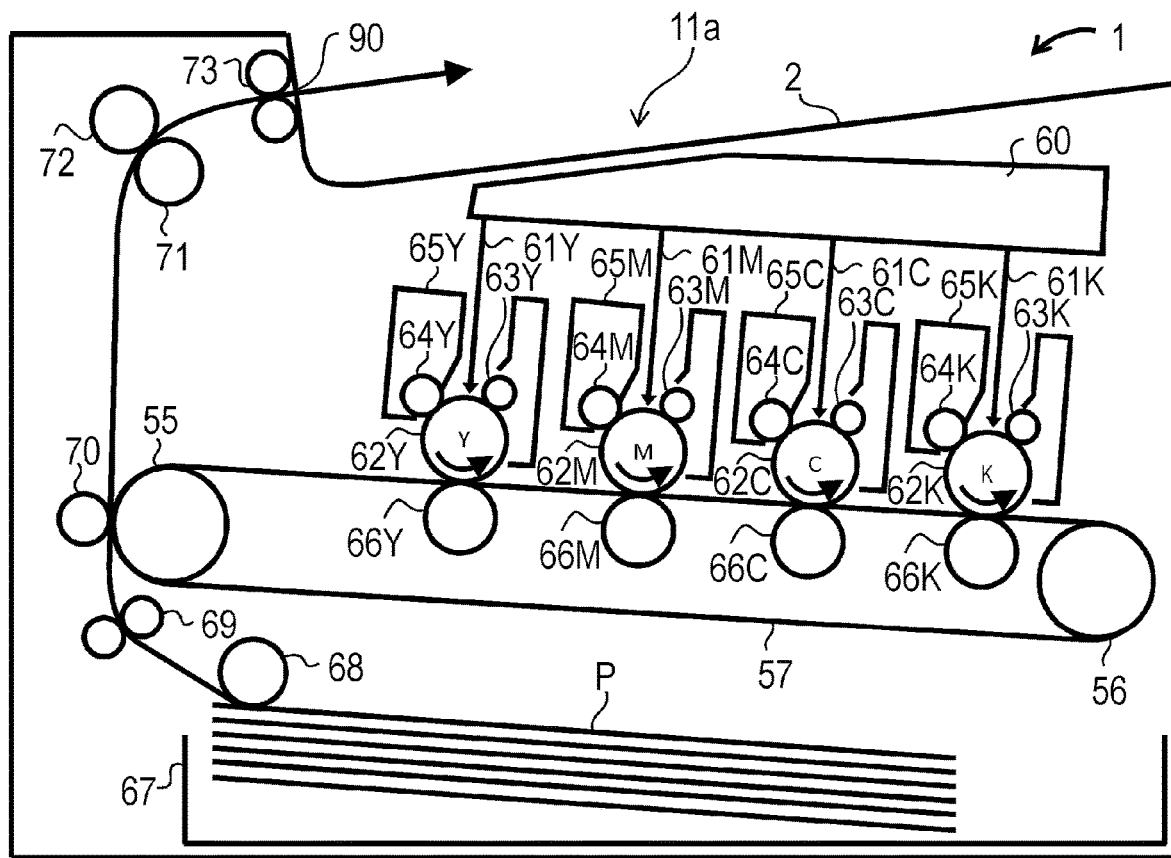
FIG. 23 is a schematic cross-sectional view of the image forming apparatus according to Embodiment 1.

FIG. 23 is a schematic cross-sectional view from the left side depicting a general configuration of the image forming apparatus 1 using an electrophotographic recording technique according to an embodiment of the present invention. The image forming apparatus 1 includes an image forming portion and a fixing portion supported by a metal frame 2. The image forming apparatus 1 includes four image forming portions which are disposed approximately in a straight line, and each of the image forming portions forms an image of each of colors: yellow (hereafter referred to as Y), magenta (hereafter referred to as M), cyan (hereafter referred to as C) and black (hereafter referred to as K). In the present embodiment, each image forming portion has substantially the same configuration and operation, except that a color of an image to be formed is different. Hence unless there is no need to distinguish between them, suffixes Y, M, C or K, which are to be included in reference signs corresponding to elements to indicate colors related to the elements, will be omitted in the following description.

Each image forming portion includes a photosensitive drum 62 (image bearing member), a charging roller 63, a developing roller 64 and a toner container 65. The image forming portion may have a configuration of a process cartridge that is integrally detachable from the apparatus. In a case where image information is received and the image forming operation is started, the photosensitive drum 62 is rotated in a direction indicated by an arrow in FIG. 23. First, an outer peripheral surface of the photosensitive drum 62 is uniformly charged by the charging roller 63, and the charged surface is irradiated with a laser beam 61 from a scanner unit 60 in accordance with the image information, so as to form an electrostatic latent image. The latent image becomes visible by the developing roller 64, whereby a toner image is formed on the surface of the photosensitive drum 62. The toner image formed by each image forming portion is transferred to an intermediate transfer belt 57 (intermediate transfer member).

The intermediate transfer belt 57, which is an endless belt member, is stretched by a driver roller 55 and a driven roller 56 along a direction where the image forming portions are lined up. The intermediate transfer belt 57 rotates along each image forming portion by the driver roller 55 rotating in accordance with a print instruction. On an inner peripheral surface side of the intermediate transfer belt 57, a primary transfer roller 66 is disposed so as to face the photosensitive drum 62, and a toner image formed by each image forming portion is sequentially transferred to the intermediate transfer belt 57 by the primary transfer roller 66 pressing the intermediate transfer belt 57 toward the direction of the photosensitive drum 62. The toner image transferred to the intermediate transfer belt 57 is conveyed to a transfer nip (contact portion with a secondary transfer roller 70) by the intermediate transfer belt 57 further rotating.

Before forming an image, a sheet type recording material P is stored in a feeding cassette 67 disposed in a lower portion of the image forming apparatus 1, is separated and fed one-by-one from the feeding cassette 67 by a feeding roller 68, and is fed to a resist roller pair 69. The resist roller pair 69 conveys the recording material P, which was fed into the transfer nip between the intermediate transfer belt 57 and the secondary transfer roller 70. The secondary transfer roller 70 is disposed to face the driver roller 55 with the intermediate transfer belt 57 therebetween. As the recording material P passes the transfer nip, bias is applied to the secondary transfer roller 70 from a high voltage power supply (not illustrated). Thereby a full color toner image is secondarily transferred from a surface of the intermediate transfer belt 57 to the recording material P, which is passing through the transfer nip.

The recording material P bearing the toner is conveyed to a fixing portion (image heating portion). The fixing portion includes a heating unit 71, where a heater is disposed on an inner side of a flexible tubular film, and a pressure roller 72 which is disposed to face the heating unit 71. The toner image carried on the recording material P is fixed to the recording material P by being pressed with heat in a fixing nip that is formed by the heating unit 71 and the pressure roller 72. Then the recording material P is discharged to outside the image forming apparatus 1 in a direction indicated by an arrow in FIG. 23 by a discharging roller 73. In the present embodiment, a user operates the apparatus from the front side of the apparatus, hence the recording material P is discharged to a discharged paper stacking portion IIa disposed near the front side of the apparatus, through a discharging outlet 90 disposed near the rear side of the apparatus. In other words, the discharging direction of the recording material P is identical to the front-back direction of the apparatus, that is, a downstream side in the discharging direction corresponds to the front side, and an upstream side opposite to the downstream side in the discharging direction correspond to the rear side. The recording material P is discharged through the discharging outlet 90 disposed near the rear side of the apparatus, and is stacked on the discharged paper stacking portion 11a located near the front side of the apparatus at a lower position than the discharging outlet 90, hence in this configuration, a user operating the apparatus from the front side can easily access the discharged recording material P.

Figure 1:
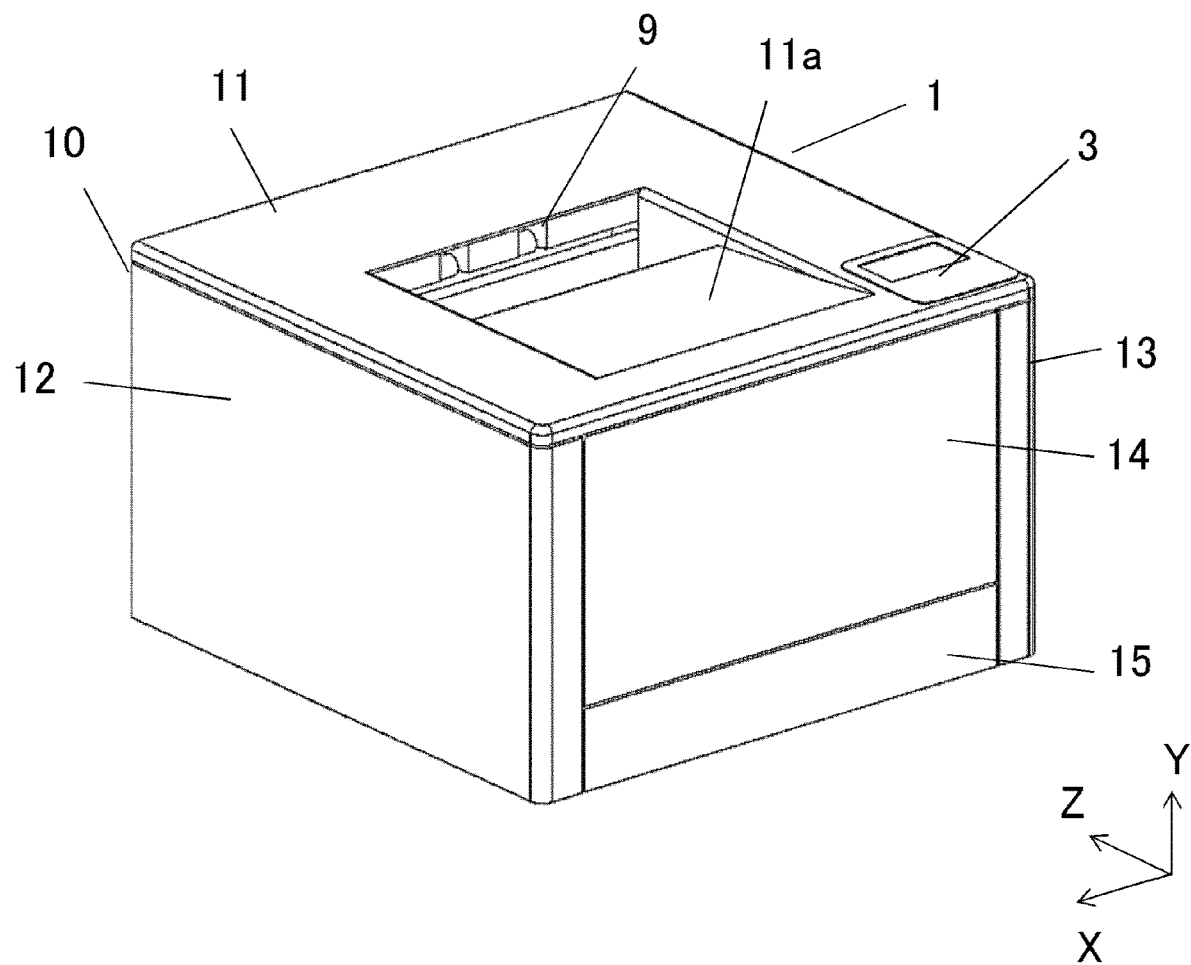
FIG. 1 is a perspective view of an image forming apparatus according to Embodiment 1.

FIG. 1 is a perspective view of the image forming apparatus according to Embodiments 1 to 3 of the present invention when viewed from the front side of the apparatus. An operation portion 3, a fixing/discharging portion 9, and the discharged paper stacking portion 11a are disposed on an upper portion of a main unit of the image forming apparatus 1. An outer surface of the image forming apparatus 1 has a plurality of covers 10 made of resin. Among the covers 10, an upper cover 11 covers at least a part of the image forming apparatus 1 on the top face side. The upper cover 11 may be separated into a plurality of covers, or may be formed integrally with other covers. A left cover 12 and a right cover 13 are disposed to the left side and right side of the upper cover 11. The front face side of the image forming apparatus 1 is covered by a front door 14 and a cassette cover 15. The front door 14 is supported by the main unit of the image forming apparatus 1 so that it can be opened and closed, allowing such consumables as toner cartridges to be replaced. The cassette cover 15 is fixed to a cassette (not illustrated), and supported by the main unit of the image forming apparatus 1 so that it can be withdrawn, allowing a user to withdraw the cassette and replace paper.

Figure 2:
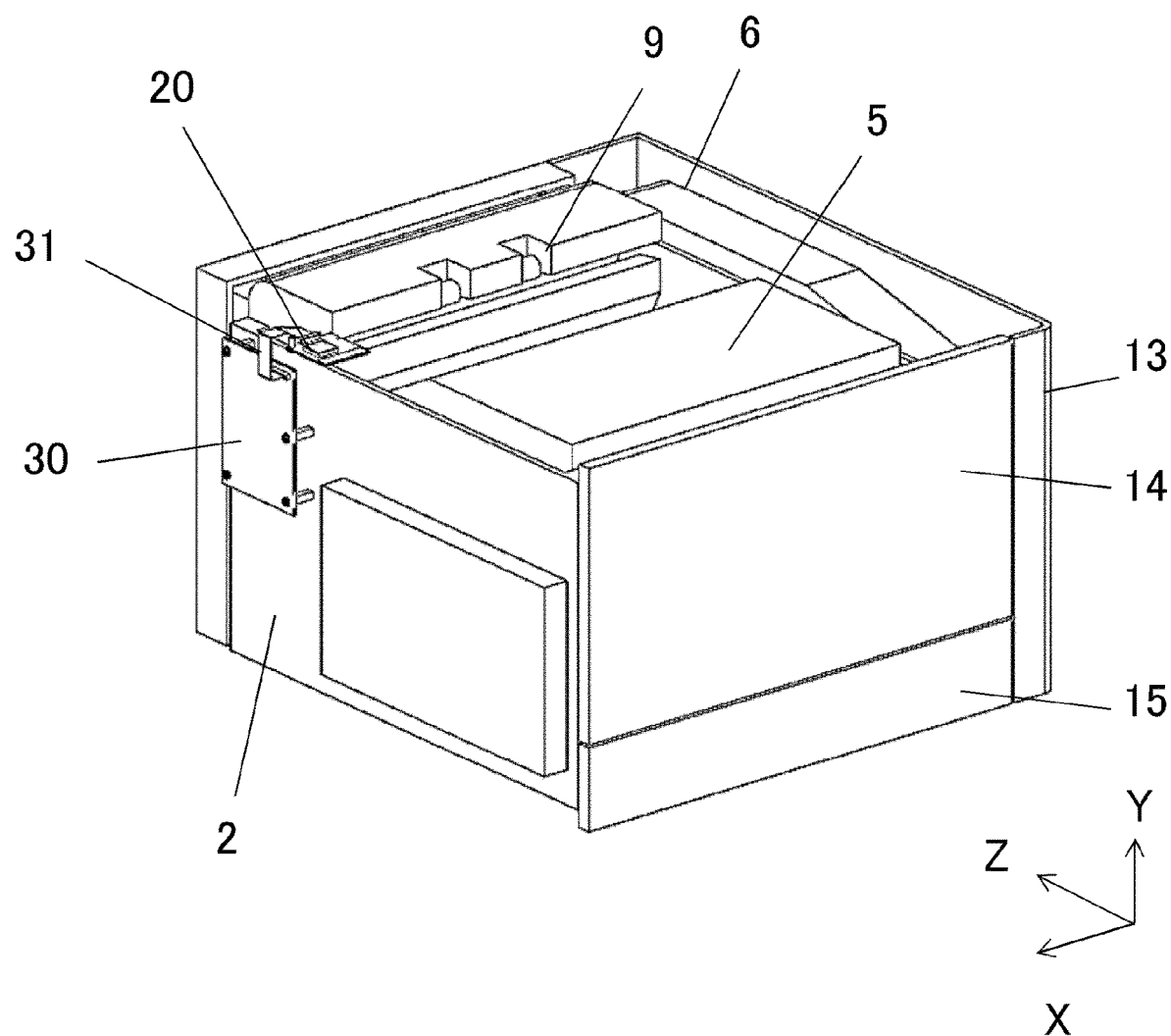
FIG. 2 is a perspective view inside the image forming apparatus according to Embodiment 1.

FIG. 2 is a perspective view inside the image forming apparatus according to Embodiment 1, where the upper cover 11 and the left cover 12 are not illustrated. A control board 30 is supported by a metal frame 2 (apparatus frame), which is a frame of the image forming apparatus 1. A wireless LAN communication module 20 is connected with the control board 30 by an FFC (flexible flat cable) 31, and is supported on the upper cover 11 (top cover), which constitutes an exterior cover. A drive portion 6 is disposed on the opposite side of the control board 30 across the frame 2, and the fixing/discharging portion 9 configured to fix the image on the recording material such as paper and discharge it, and a laser scanner 5 configured to form a latent image, are disposed within the frame 2.

Figure 3A:
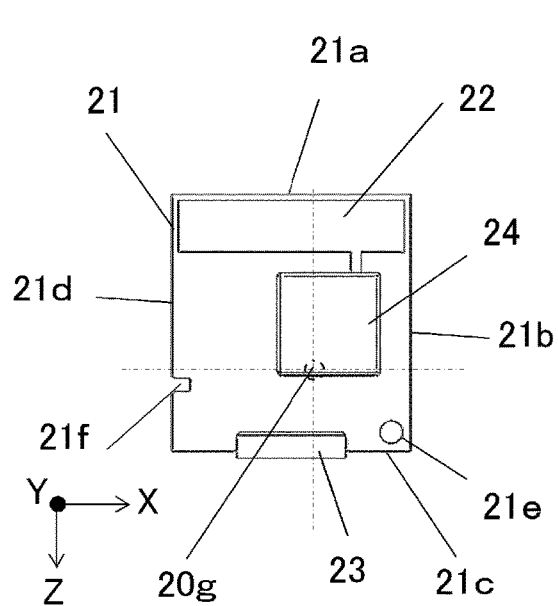
FIGS. 3A to 3D are explanatory diagrams of a wireless communication module according to Embodiment 1.
Figure 3B:
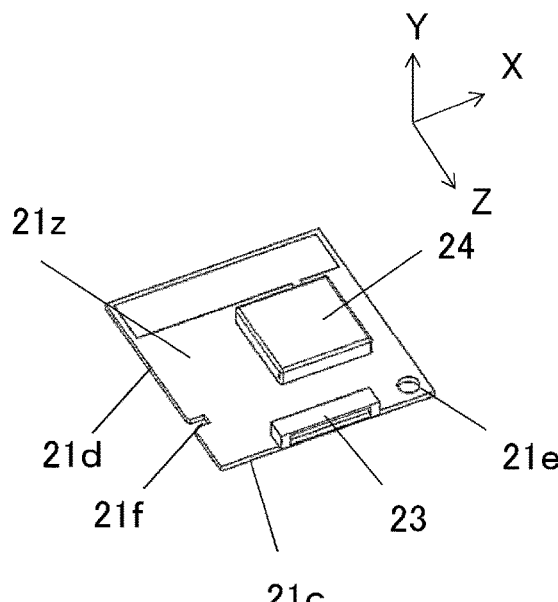
Figure 3C:
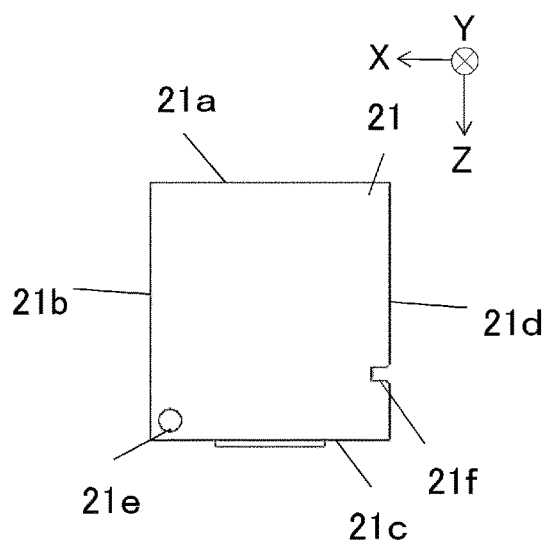
Figure 3D:
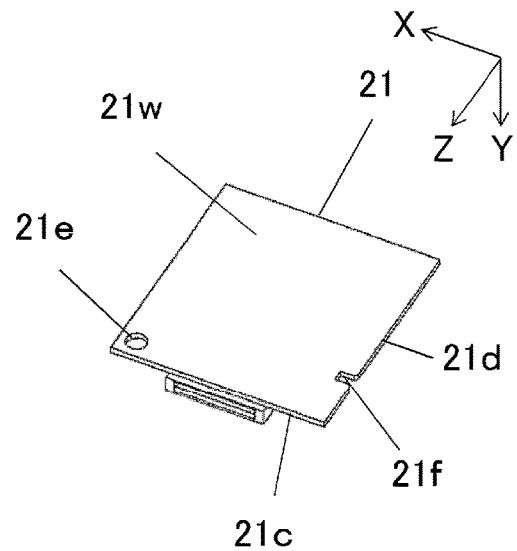

FIGS. 3A to 3D are explanatory diagrams of a configuration of the wireless LAN communication module 20 (wireless communication module) according to Embodiment 1, which includes an antenna for wireless LAN communication (for wireless communication). FIG. 3A is a plan view of the wireless LAN communication module 20 illustrating a configuration of a mounting surface side of a board 21. FIG. 3B is a perspective view of the wireless LAN communication module 20 illustrating the configuration of the mounting surface side of the board 21. FIG. 3C is a plan view of the wireless LAN communication module 20 illustrating a configuration of a surface on the opposite side of the mounting surface of the board 21. FIG. 3D is a perspective view of the wireless LAN communication module 20 illustrating a configuration of the surface on the opposite side of the mounting surface of the board 21.

The wireless LAN communication module 20 includes the board 21 having mainly electronic circuits, an antenna 22, electronic elements (not illustrated), a shield 24 covering the electronic elements, and a connector 23 to connect with the control board 30, which controls operation of the image forming apparatus 1, via a cable. The board 21 has a rectangular outer shape, and includes a hole 21e and a notch 21f. A surface of the board 21 closer to the upper cover 11 side is referred to as a front face 21z, and a surface on the opposite side thereof is referred to as a rear face 21w. The antenna 22 is disposed near an end face 21a constituting an outer form of the board 21. When the board 21 is viewed in a direction perpendicular to the mounting surface where the antenna 22 is mounted, a side of the board 21 formed by the end face 21a, among four sides constituting the rectangular outer shape of the board 21, corresponds to a first side. The connector 23 is disposed near an end face 21c that faces the antenna 22 across the shield 24. A side of the board 21 formed by the end face 21c corresponds to a second side, and a direction in which the first side and the second side face each other corresponds to a first direction. That is, the first side and the second side are parallel, and the first direction is orthogonal to both the first side and the second side. The hole 21e is disposed at a corner where the end face 21c and an end face 21b intersect with each other, the end face 21c being close to the connector 23 and the end face 21b being close to the shield 24. In other words, the antenna 22 is disposed at a position closer to the end face 21a than to the end face 21c of the outer shape of the board 21, and the hole 21e is disposed at a position closer to the end face 21c than to the end face 21a of the outer shape of the board 21. A notch 21f is disposed on an end face 21d side that is on the opposite side of the end face 21b across the connector 23, the end face 21d corresponding to a fourth side. The weight of the wireless LAN communication module 20 is mainly due to the shield 24, the connector 23 and the board 21. When viewed from a plane parallel to the surface of the board 21, a center of gravity 20g of the wireless LAN communication module 20 (center of gravity of the board 21 in a state where the antenna 22, the connector 23, the shield 24 and the like are mounted) is closest to the corner where the end faces 21b and 21c intersect among the four corners of the board 21. The board 21 has two sides that extend in the first direction. Among the two sides, a side of the board 21 formed by the end face 21b, which is distant from the antenna 22 and is close to the center of gravity 20g, corresponds to a third side. A side of the board 21 formed by the end face 21d, which is close to the antenna 22 and distant from the center of gravity 20g, and which extends along the third side, corresponds to the fourth side. A second direction is defined as a direction orthogonal to both the third side and the fourth side.

Figure 4A:
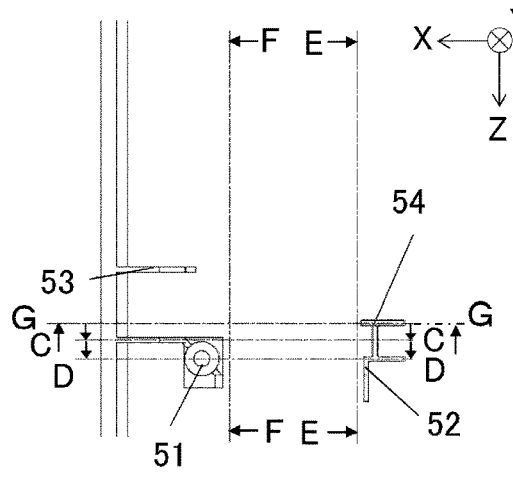
FIGS. 4A to 4G are explanatory diagrams of an upper cover according to Embodiment 1.
Figure 4B:
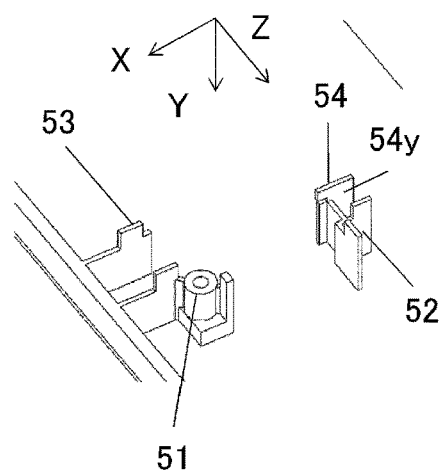
Figure 4C:
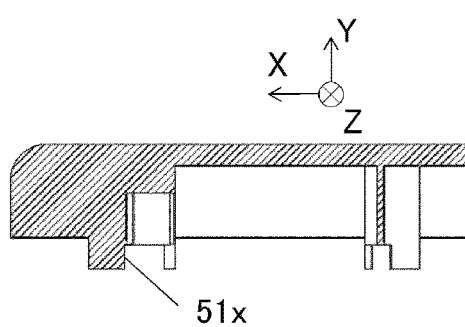
Figure 4D:
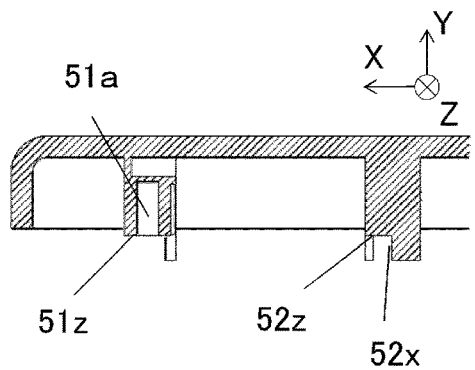
Figures 4E, 4F:
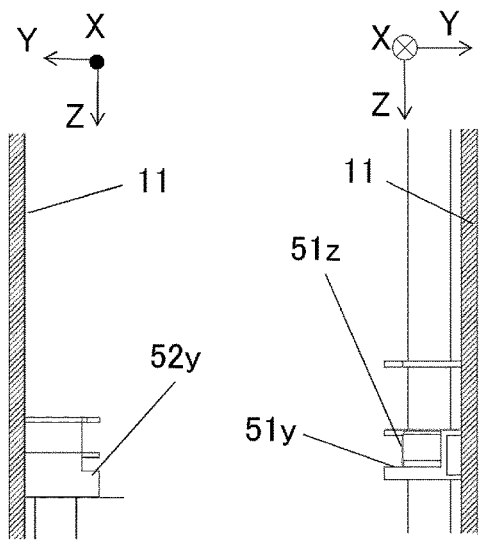
Figure 4G:
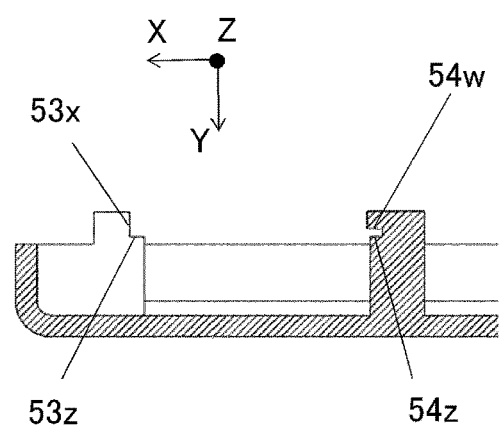

FIGS. 4A to 4G are explanatory diagrams of a support portion of the wireless LAN communication module 20 on the upper cover 11 according to Embodiment 1. FIG. 4A is a plan view, FIG. 4B is a perspective view, FIG. 4C is a cross-sectional view along C-C line in FIG. 4A, FIG. 4D is a cross-sectional view along D-D line in FIG. 4A, FIG. 4E is a cross-sectional view along E-E line in FIG. 4A, FIG. 4F is a cross-sectional view along F-F line in FIG. 4A, and FIG. 4G is a cross-sectional view along G-G line in FIG. 4A.

The upper cover 11 includes a support portion 51 to support the wireless LAN communication module 20, and regulating portions 52, 53 and 54. The support portion 51 has a screw hole 51a, regulating surfaces 51x and 51y, and a receiving surface 51z. The screw hole 51a is configured so that a screw 32 can be fastened. The regulating portion 52 has regulating surfaces 52x and 52y and a receiving surface 52z. The regulating portion 53 has a regulating surface 53x and a receiving surface 53z. The regulating portion 54 has a regulating surface 54y, a receiving surface 54z and a hook surface 54w.

Figure 6:
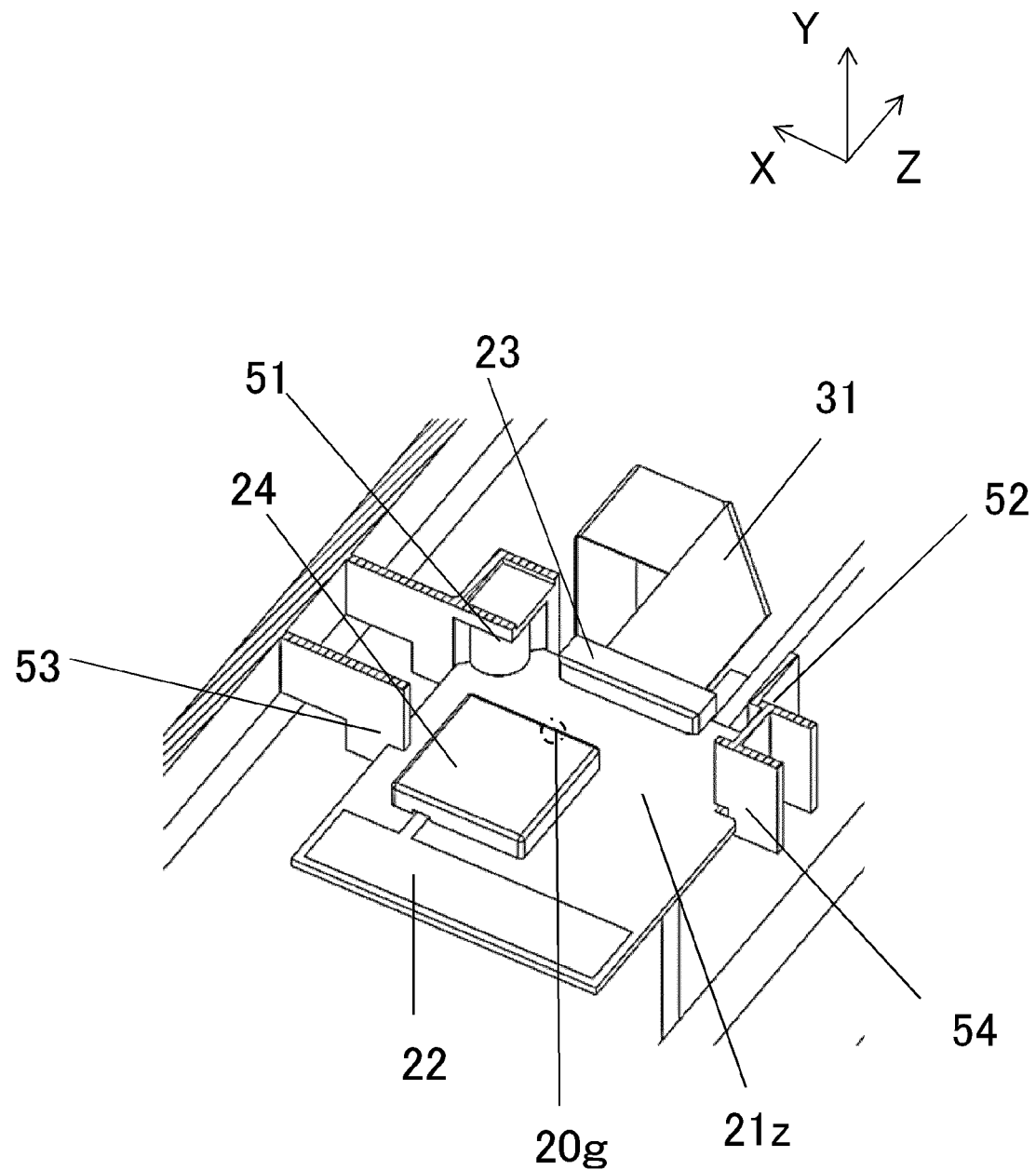
FIG. 6 is a cross-sectional perspective view of the image forming apparatus according to Embodiment 1.

FIGS. 5A to 5G are explanatory diagrams of a state where the wireless LAN communication module 20 according to Embodiment 1 is screwed into the upper cover 11 using the screw 32, and FIG. 6 is a cross-sectional perspective view of an internal configuration of the image forming apparatus 1 in an area near the wireless LAN communication module 20 according to Embodiment 1. FIG. 5A is a plan view, FIG. 5B is a perspective view, FIG. 5C is a cross-sectional view along C-C line in FIG. 5A, FIG. 5D is a cross-sectional view along D-D line in FIG. 5A, FIG. 5E is a cross-sectional view along E-E line in FIG. 5A, FIG. 5F is a cross-sectional view along F-F line in FIG. 5A, and FIG. 5G is a cross-sectional view along G-G line in FIG. 5A.

The regulating surface 51x regulates a movement of the end face 21b of the board 21 in the +X direction (second regulating portion), and the regulating surface 52x regulates a movement of the end face 21d of the board 21 in the -X direction (third regulating portion). By these regulating functions, a rotation of the wireless LAN communication module 20 and the movement of the wireless LAN communication module 20 in an apparatus width direction (X direction) are regulated. The regulating surfaces 51y and 52y regulate a movement of the end face 21c of the board 21 in the -Z direction (first regulating portion). The regulating surface 54y of the regulating portion 54 engages with the notch 21f, which is a recess portion formed on the end face 21d of the board 21, whereby the regulating portion 54 contacts with the notch 21f in the Z direction. Thereby the movement of the wireless LAN communication module 20 in the front-back direction (Z direction) of the image forming apparatus 1 is regulated (fourth regulating portion). The regulating surface 53x regulates a movement of the end face 21b of the board 21 in the +X direction (fifth regulating portion), just like the regulating surface 51x. Furthermore, a movement of the wireless LAN communication module 20 in the Y direction is regulated by the receiving surfaces 51z, 52z and 53z regulating the front face 21z of the board 21, and a seat surface 32w of the screw 32 and the hook surface 54w of the regulating portion 54 regulating the rear face 21w of the board 21. Here the movement of the wireless LAN communication module 20 in the +Z direction and +X direction is regulated by the support portion 51 (51x and 51y) contacting an area near a corner of the board 21 between the end face 21c and the end face 21b (first corner). Further, the movement of the wireless LAN communication module 20 in the -Z direction and -X direction is regulated by the regulating portion 52 (52x and 52y) and the regulating portion 54 contacting an area near a corner of the board 21 between the end face 21c and the end face 21d (second corner). Furthermore, the movement of the wireless LAN communication module 20 in the +X direction is regulated by the regulating portion 53 contacting the end face 21b. In this way, the wireless LAN communication module 20 is supported on the upper cover 11.

In order to support the wireless LAN communication module 20 on the upper cover 11, the support portion 51 plays a major role. Specifically, the board 21 is held between the seat surface 32w of the screw 32 and the receiving surface 51z by fastening the screw 32 and the screw hole 51a via the hole 21e of the wireless LAN communication module 20. Thereby a frictional force is generated between the seat surface 32w and the rear face 21w of the board 21, and between the receiving surface 51z and the front face 21z of the board 21. By this frictional force, rotation of the wireless LAN communication module 20 in the horizontal direction and movement of the wireless LAN communication module 20 in the front-back direction (Z direction) and the width direction (X direction) of the image forming apparatus 1 are regulated. Further movement and tilting of the wireless LAN communication module 20 in the vertical direction (Y direction) of the image forming apparatus 1 are also regulated by the board 21 being held between the seat surface 32w and the receiving surface 51z. Since the regulating portions 52, 53 and 54 are disposed mainly for stabilization during assembly, the upper cover 11 may include only the support portion 51 without disposing the regulating portions 52, 53 and 54, in a case where, for example, a jig is used for assembly. As illustrated in FIG. 5A, in the plan view of the wireless LAN communication module 20 (board 21), a center of gravity 20g exists in a region surrounded by imaginary lines connecting the support portion 51 and the regulating portions 52, 53 and 54 (a region that is bordered by an imaginary line connecting a position of the fourth regulating portion and a position of the fifth regulating portion, and includes the second side). By this configuration, the wireless LAN communication module 20 can be installed stably on the upper cover 11. Further, assuming that the surface of the board 21 is separated into four regions by bisectors of horizontal sides and vertical sides (as illustrated by four regions indicated by dashed lines in FIG. 5A), the center of gravity 20g and a fastened portion by the screw 32 exist in a same region among the regions. This configuration can also effectively support the wireless LAN communication module 20. The center of gravity 20g is closer to the end face 21b than to the end face 21d of the board 21. This allows the regulating portion 54 to be disposed more distantly from the antenna 22 than the regulating portion 53. This prevents the regulating portion 54 from being obstructions for the antenna 22. As described above, by appropriately supporting the wireless LAN communication module 20 at a location distant from the antenna 22, an image forming apparatus having good communication performance can be provided.

Embodiment 2

Figure 7:
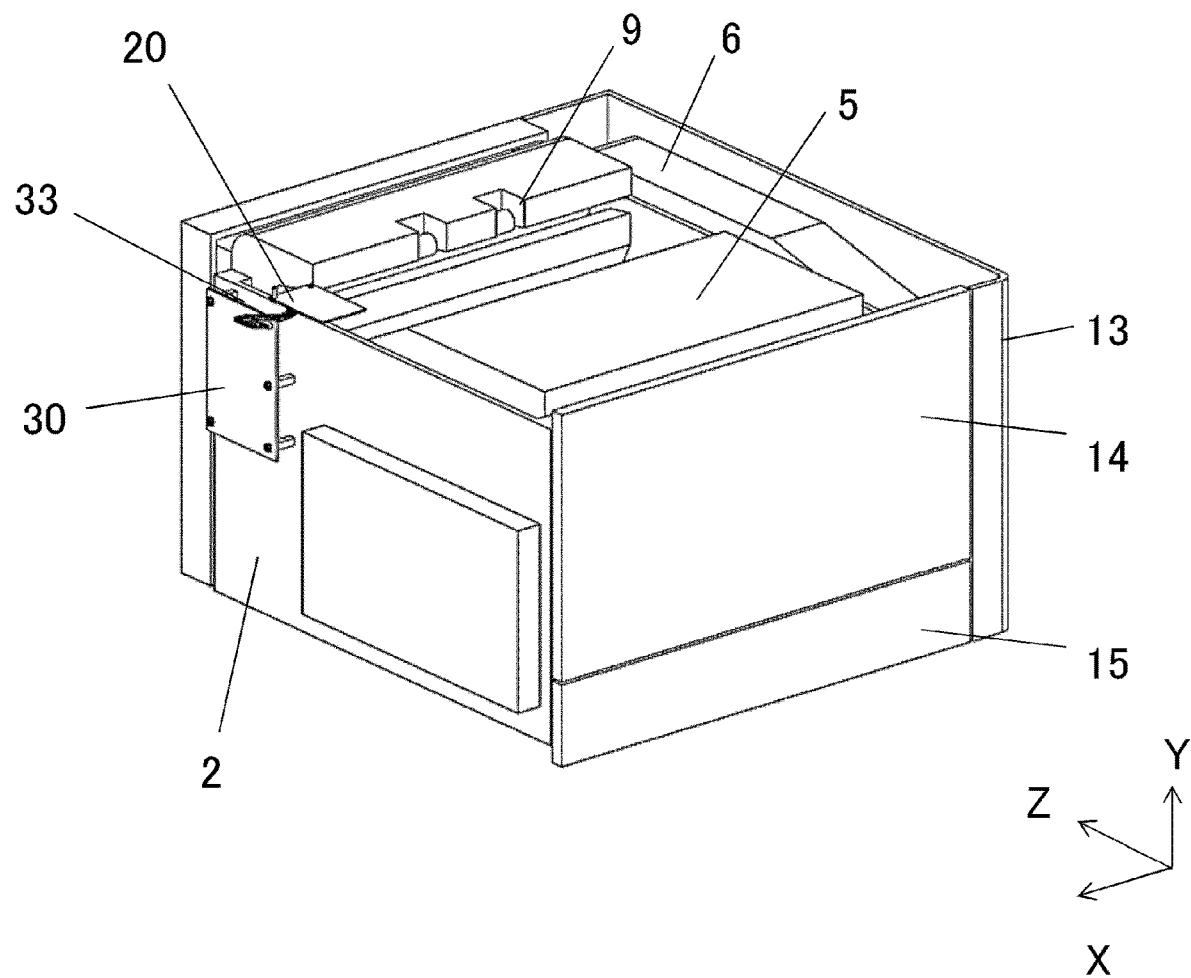
FIG. 7 is a perspective view inside an image forming apparatus according to Embodiment 2.

A configuration of an image forming apparatus according to Embodiment 2 of the present invention will be described with reference to FIGS. 7 to 11. Regarding elements that are same as those of Embodiment 1, the same reference signs as Embodiment 1 will be used for the elements or the same terms as Embodiment 1 will be used for the elements and descriptions thereof will be omitted. FIG. 7 is a perspective view inside the image forming apparatus 1 according to Embodiment 2, where the upper cover 11 and the left cover 12 are not illustrated.

The control board 30 is supported by the frame 2, which is a frame of the image forming apparatus 1. The wireless LAN communication module 20 is connected with the control board 30 by a bundle wire 33, and is supported on the upper cover 11. The drive portion 6 is disposed on the opposite side of the control board 30 across the frame 2, and the fixing/discharging portion 9 configured to fix the image on the paper and discharge the paper, and the laser scanner 5 configured to form a latent image, are disposed within the frame 2. The wireless LAN communication module 20 of Embodiment 2 is supported so that the mounting surface of the board 21 on which the antenna 22 and the like are mounted faces toward the frame 2 side (faces in the -Y direction), unlike Embodiment 1, in which the mounting surface of the board 21 faces upward (+Y direction) so that the antenna 22 and the like are disposed on the upper cover 11 side.

Figure 8A:
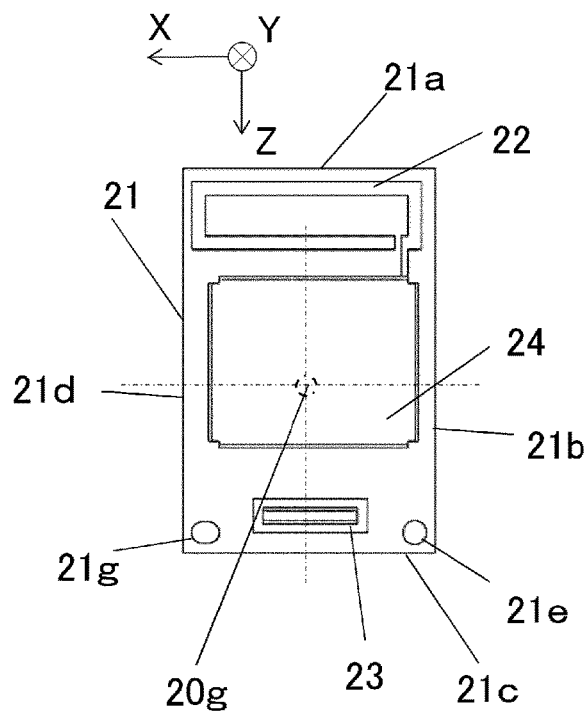
FIGS. 8A to 8D are explanatory diagrams of a wireless LAN communication module according to Embodiment 2.
Figure 8B:
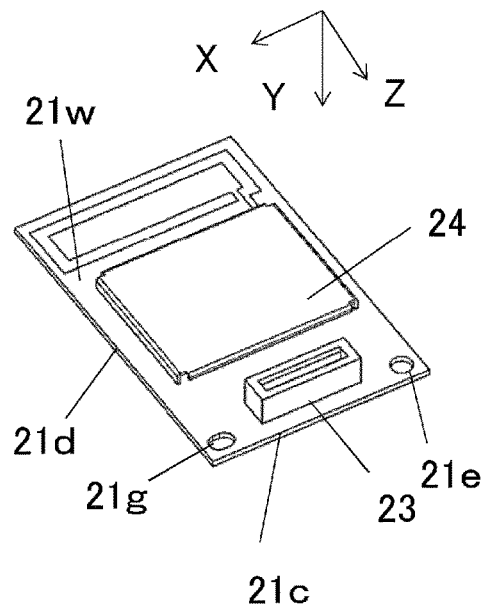
Figure 8C:
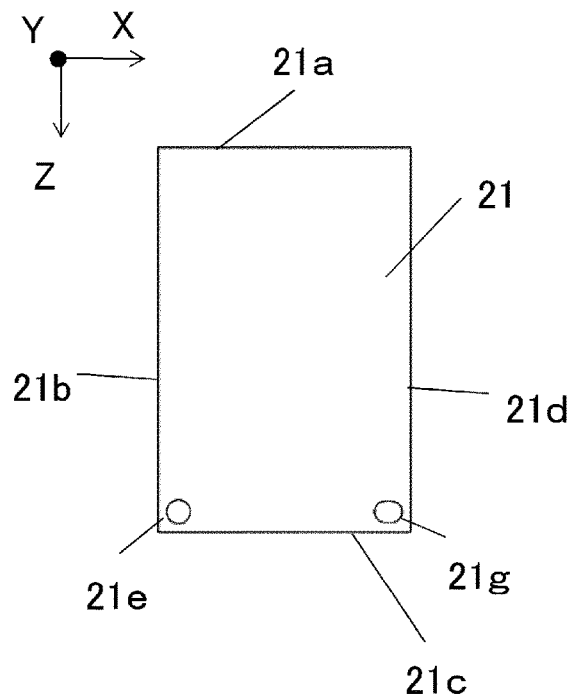
Figure 8D:
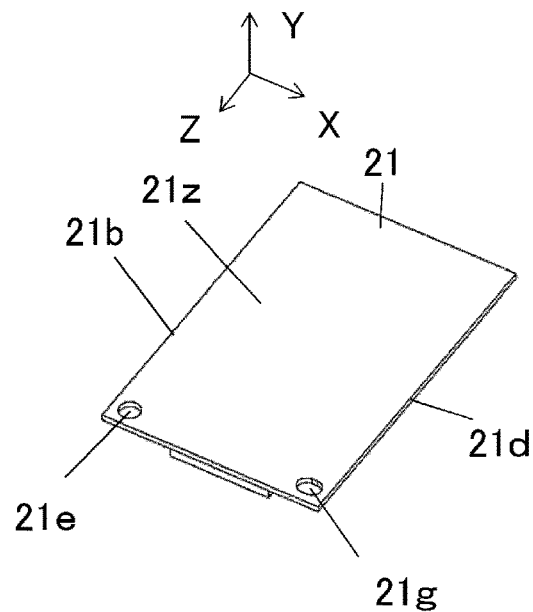

FIGS. 8A to 8D are explanatory diagrams of a configuration of the wireless LAN communication module 20 according to Embodiment 2, which includes an antenna 22 for wireless LAN communication. FIG. 8A is a plan view of the wireless LAN communication module 20 illustrating the configuration of the mounting surface side of the board 21. FIG. 8B is a perspective view of the wireless LAN communication module 20 illustrating the configuration of the mounting surface side of the board 21. FIG. 8C is a plan view of the wireless LAN communication module 20 illustrating the configuration of the surface on the opposite side of the mounting surface of the board 21. FIG. 8D is a perspective view of the wireless LAN communication module 20 illustrating the configuration of the surface on the opposite side of the mounting surface of the board 21.

The wireless communication module 20 includes the board 21 having mainly electronic circuits, the antenna 22, electronic elements (not illustrated), the shield 24 that covers the electronic elements, and the connector 23 to connect with the control board 30 via a cable. The board 21 has a rectangular outer shape, and includes the hole 21e (second hole), and an elliptical hole 21g fastened with a screw. A surface of the board 21 closer to the upper cover 11 is referred to as the front face 21z, and a surface on the opposite side thereof is referred to as the rear face 21w. The antenna 22 is disposed near the end face 21a constituting the outer form of the board 21. The connector 23 is disposed near the end face 21c, which faces the antenna 22 across the shield 24. The hole 21e is disposed at a corner where the end face 21c and the end face 21b that is close to the connector 23 intersect with each other. The elliptical hole 21g is disposed on the end face 21d side, which is the opposite side of the end face 21b across the connector 23. The side of the board 21 formed by the end face 21a corresponds to the first side, and the side of the board 21 formed by the end face 21c corresponds to the second side. The side of the board 21 formed by the end face 21d near the elliptical hole 21g (first hole) corresponds to the third side, out of the third side and the fourth side of the board 21 which extend in the first direction, which is orthogonal to the second direction in which the first side and the second side extend. The side of the board 21 formed by the end face 21b near the hole 21e (second hole) corresponds to the fourth side. The corner of the board 21, in which the elliptical hole 21g fastened with the screw is disposed, corresponds to the first corner, and the corner of the board 21, in which the hole 21e engaged with a later mentioned boss 52a is disposed, corresponds to the second corner. The weight of the wireless LAN communication module 20 is mainly due to the shield 24, the connector 23 and the board 21. When viewed from a plane parallel to the surface of the board 21, the center of gravity 20g of the wireless LAN communication module 20 is closer to the end face 21c than to the end face 21a.

FIGS. 9A to 9E are explanatory diagrams of the support portion 51 of the wireless LAN communication module 20 on the upper cover 11 according to Embodiment 2. FIG. 9A is a plan view, FIG. 9B is a perspective view, FIG. 9C is a cross-sectional view along C-C line in FIG. 9A, FIG. 9D is a cross-sectional view along D-D line in FIG. 9A, and FIG. 9E is a cross-sectional view along E-E line in FIG. 9A.

The upper cover 11 includes the support portion 51 to support the wireless LAN communication module 20 and the regulating portion 52. The support portion 51 has the screw hole 51a and the receiving surface 51z. The screw hole 51a is configured so that the screw 32 can be fastened. The regulating portion 52 has the boss 52a and the receiving surface 52z.

Figure 10A:
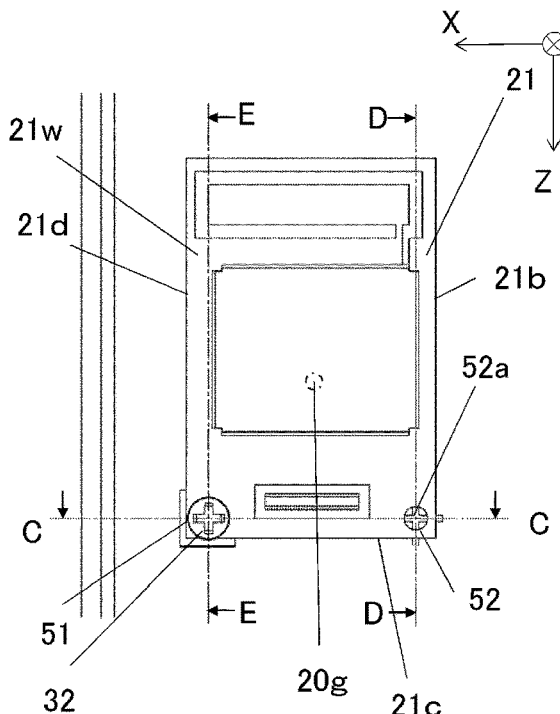
FIGS. 10A to 10E are explanatory diagrams of the upper cover and the wireless LAN communication module in an installed state according to Embodiment 2.
Figure 10B:
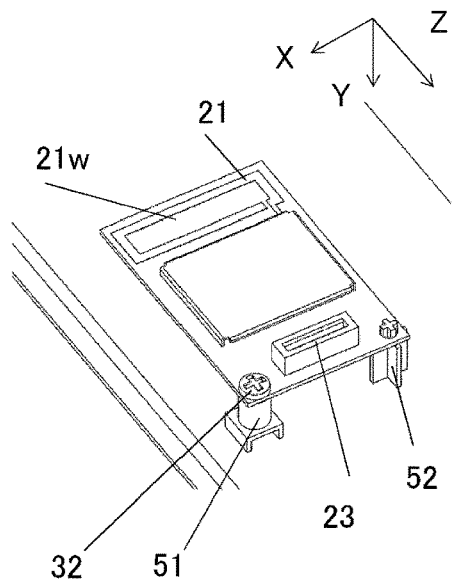
Figure 10C:
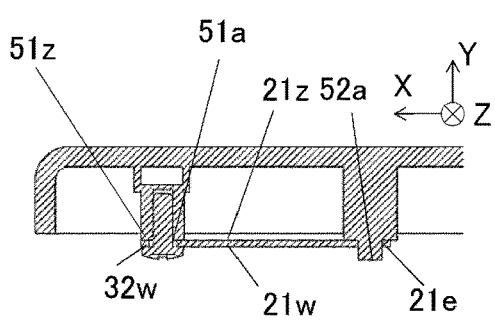
Figure 10D:
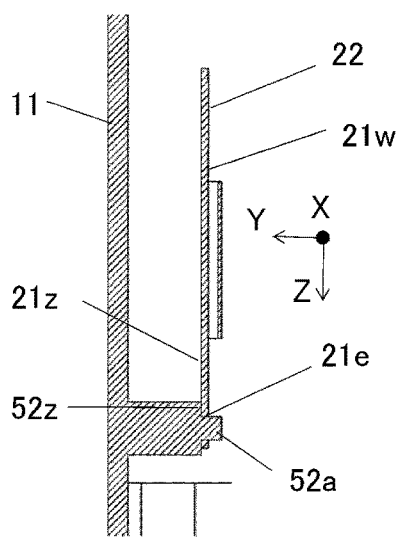
Figure 10E:
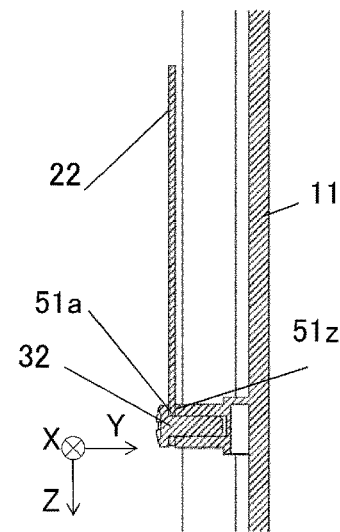
Figure 11:
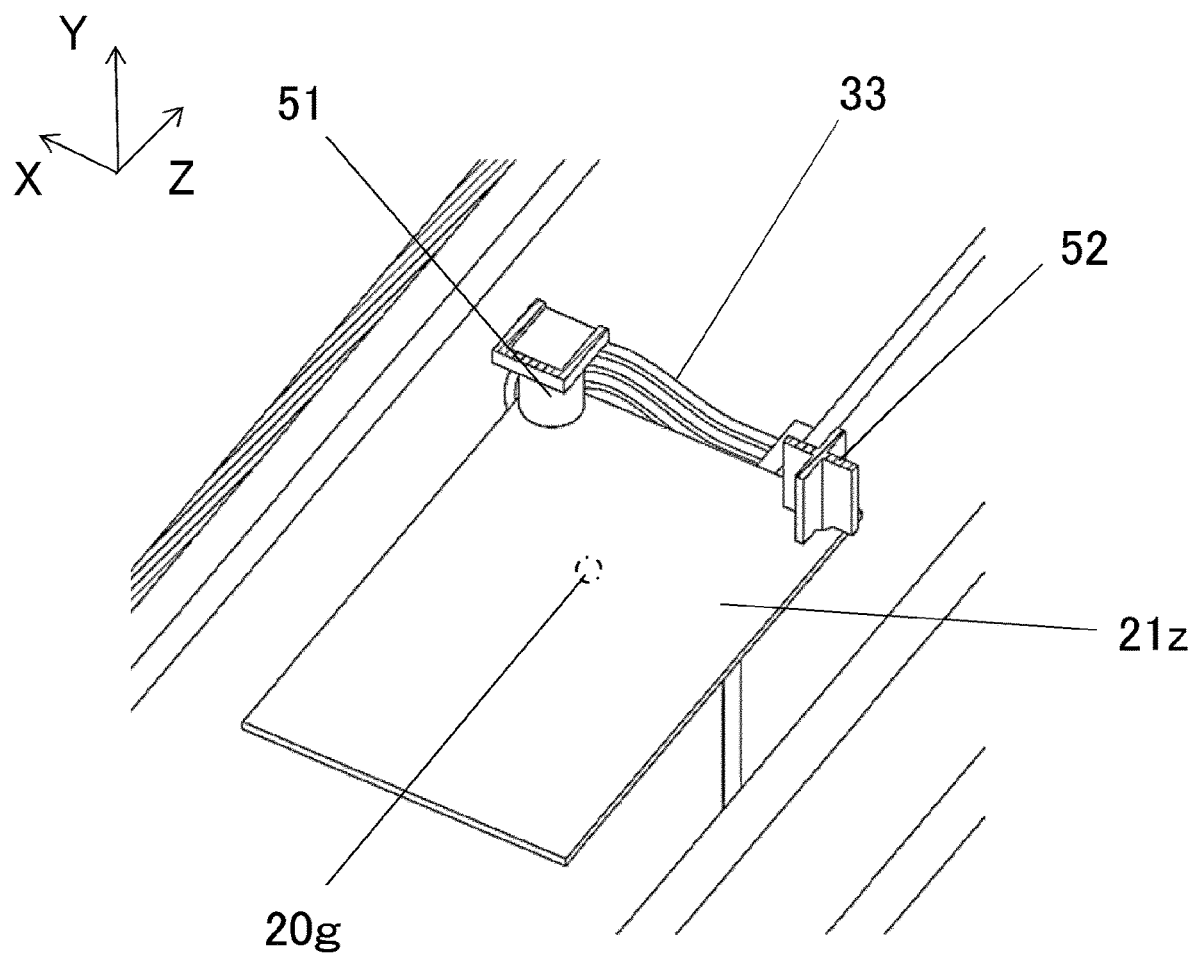
FIG. 11 is a cross-sectional perspective view of the image forming apparatus according to Embodiment 2.

FIGS. 10A to 10E are explanatory diagrams of a state where the wireless LAN communication module 20 according to Embodiment 2 is screwed into the upper cover 11 using the screw 32, and FIG. 11 is a cross-sectional perspective view of an internal configuration of the image forming apparatus 1 in an area near the wireless LAN communication module 20 according to Embodiment 2. FIG. 10A is a plan view, FIG. 10B is a perspective view, FIG. 10C is a cross-sectional view along C-C line in FIG. 10A, FIG. 10D is a cross-sectional view along D-D line in FIG. 10A, and FIG. 10E is a cross-sectional view along E-E line in FIG. 10A.

The boss 52a is fitted with the hole 21e of the board 21, and guides so as to regulate the movement of the wireless LAN communication module 20 in the front-back direction (Z direction) and the width direction (X direction) of the image forming apparatus 1. An outer diameter of the screw 32 is fitted with the elliptical hole 21g of the board 21 in the front-back direction (Z direction) of the image forming apparatus 1, so as to regulate rotation of the wireless LAN communication module 20. The receiving surfaces 51z and 52z contact with the front face 21z of the board 21, and the board 21 is held between the seat surface 32w of the screw 32 and the receiving surface 51z of the upper cover 11, whereby movement and tilting of the wireless LAN communication module 20 in the vertical direction (Y direction) of the image forming apparatus 1 are regulated. In this way, the wireless LAN communication module 20 is supported on the upper cover 11.

In order to support the wireless LAN communication module 20 on the upper cover 11, the support portion 51 plays a major role. Specifically, the board 21 is held between the seat surface 32w of the screw 32 and the receiving surface 51z, thereby a frictional force is generated between the seat surface 32w and the rear face 21w of the board 21, and between the receiving surface 51z and the front face 21z of the board 21. By this frictional force, the rotation of the wireless LAN communication module 20 in the horizontal direction and the movement of the wireless LAN communication module 20 in the front-back direction (Z direction) and the width direction (X direction) of the apparatus are regulated. Further movement and the tilting of the wireless LAN communication module 20 in the vertical direction (Y direction) of the image forming apparatus 1 are also regulated by the board 21 being held between the seat surface 32w and the receiving surface 51z. Since the regulating portion 52 is disposed for stabilization during assembly, the upper cover 11 may include only the support portion 51 without disposing the regulating portion 52 in a case where, for example, a jig is used for the assembly. As described above, by appropriately supporting the wireless LAN communication module 20 at locations distant from the antenna 22, an image forming apparatus having good communication performance can be provided.

Embodiment 3

Figure 12:
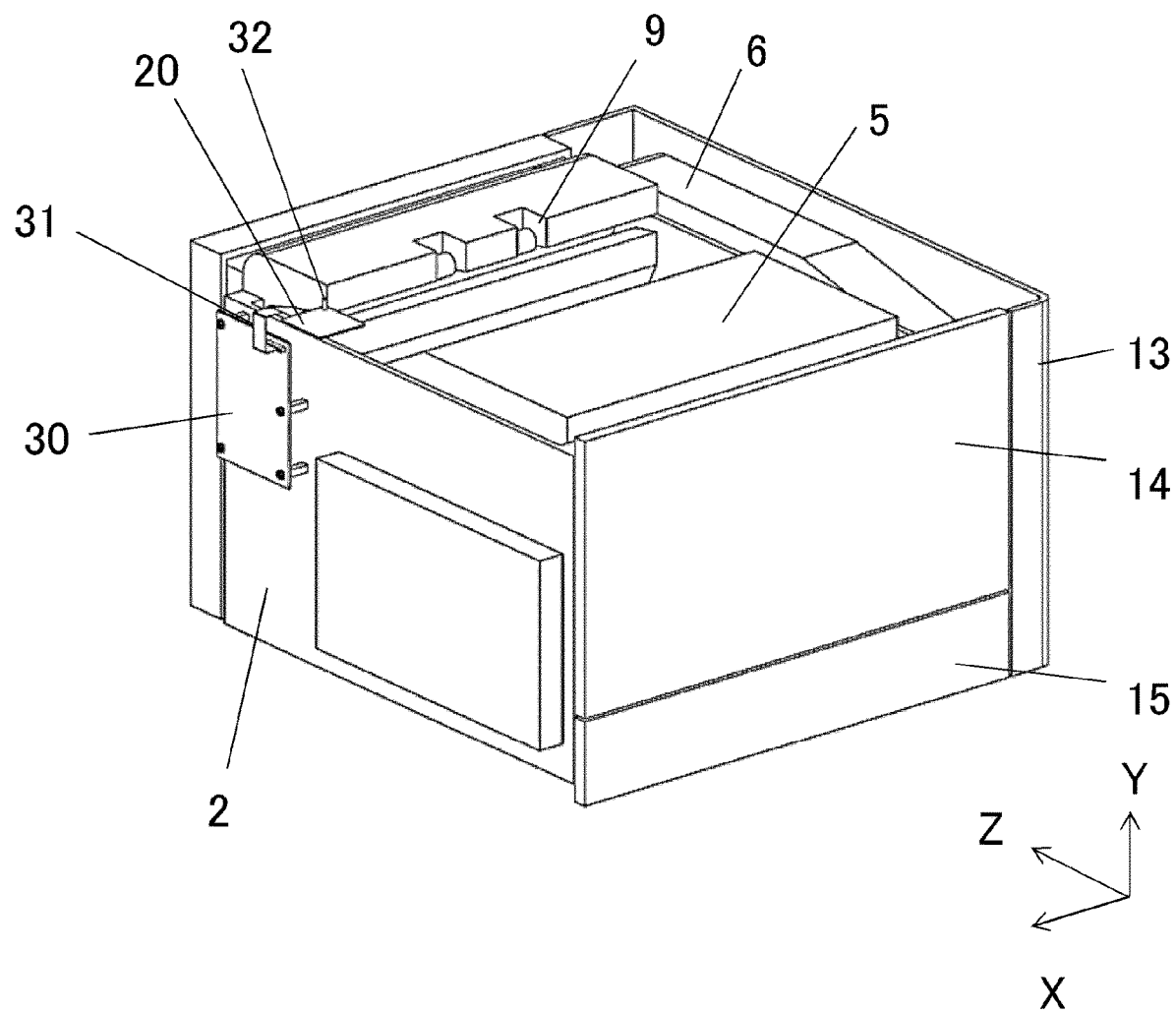
FIG. 12 is a perspective view inside an image forming apparatus according to Embodiment 3.

A configuration of an image forming apparatus according to Embodiment 3 of the present invention will be described with reference to FIGS. 12 to 16. Regarding elements that are same as those of Embodiment 1, the same reference signs as Embodiment 1 will be used for the elements or the same terms as Embodiment 1 will be used for the elements and descriptions thereof will be omitted. FIG. 12 is a perspective view inside the image forming apparatus according to Embodiment 3, where the upper cover 11 and the left cover 12 are not illustrated. The control board 30 is supported by the frame 2 which is a frame of the image forming apparatus 1. The wireless LAN communication module 20 is connected with the control board 30 by an FFC 31, and is supported on the upper cover 11. The drive portion 6 is disposed on the opposite side of the control board 30 across the frame 2, and the fixing/discharging portion 9 configured to fix the image on the paper and discharge the paper, and the laser scanner 5 configured to form a latent image, are disposed within the frame 2.

FIGS. 13A to 13D are explanatory diagrams of a configuration of the wireless LAN communication module 20 according to Embodiment 3, which includes an antenna 22 for wireless LAN communication. FIG. 13A is a plan view of the wireless LAN communication module 20 illustrating the configuration of the mounting surface side of the board 21. FIG. 13B is a perspective view of the wireless LAN communication module 20 illustrating the configuration of the mounting surface side of the board 21. FIG. 13C is a plan view of the wireless LAN communication module 20 illustrating the configuration of the surface on the opposite side of the mounting surface of the board 21. FIG. 13D is a perspective view of the wireless LAN communication module 20 illustrating the configuration of the surface on the opposite side of the mounting surface of the board 21.

The wireless LAN communication module 20 includes the board 21 having mainly electronic circuits, a first antenna 22a, a second antenna 22b, electronic elements (not illustrated), the shield 24 that covers the electronic elements, and the connector 23 to connect with the control board 30 via a cable. The board 21 has a rectangular outer shape, and includes the hole 21e. The surface of the board 21 closer to the upper cover 11 is referred to as the front face 21z, and the surface on the opposite side thereof is referred to as the rear face 21w. The first antenna 22a is disposed near the end face 21a constituting the outer form of the board 21, and the second antenna 22b is disposed near the end face 21d constituting the outer form of the board 21. The connector 23 is disposed near the end face 21c, which faces the first antenna 22a across the shield 24. The hole 21e is disposed at a corner where the end face 21c and the end face 21b intersect with each other, the end face 21c being close to the connector 23 and the end face 21b being close to the shield 24. The weight of the wireless LAN communication module 20 is mainly due to the shield 24, the connector 23 and the board 21. When viewed from a plane parallel to the surface of the board 21, the center of gravity 20g of the wireless LAN communication module 20 is closest to the corner formed by the end face 21b and the end face 21c among the four corners of the board 21.

Figure 14A:
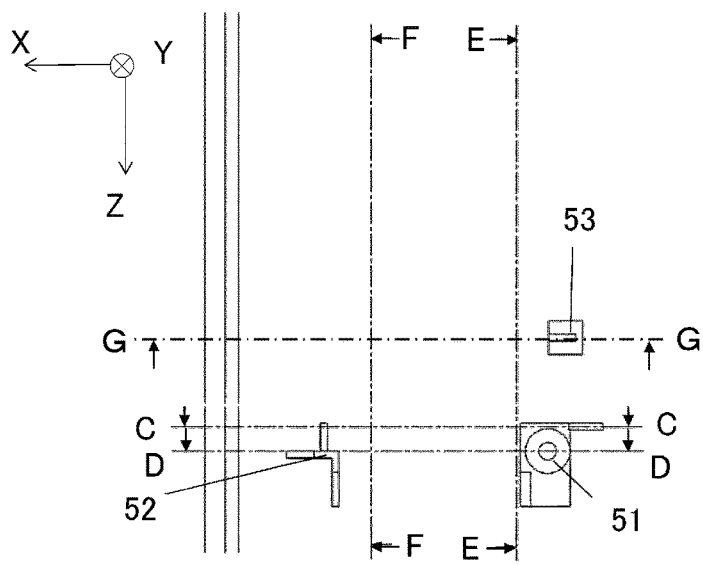
FIG. 14A to 14G are explanatory diagrams of an upper cover according to Embodiment 3.
Figure 14B:
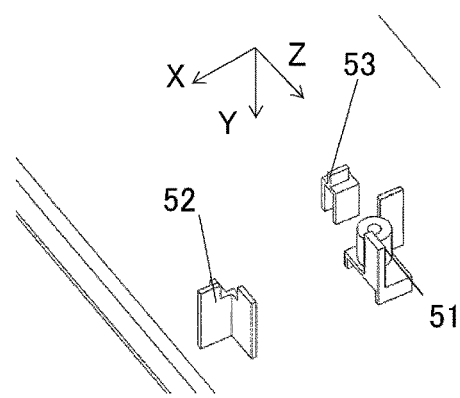
Figure 14C:
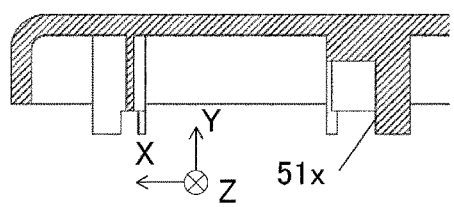
Figure 14D:
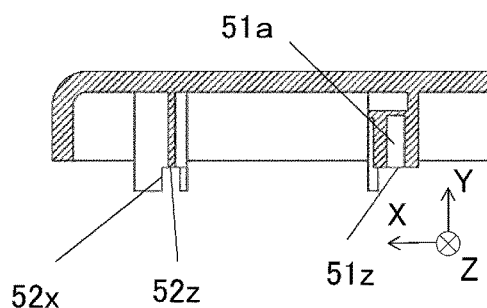
Figures 14E, 14F:
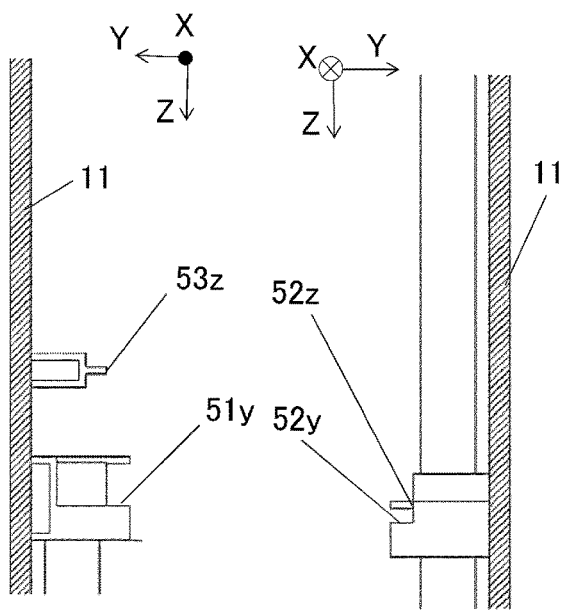
Figure 14G:
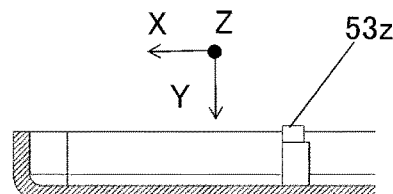

FIGS. 14A to 14G are explanatory diagrams of the support portion 51 of the wireless LAN communication module 20 on the upper cover 11 according to Embodiment 3. FIG. 14A is a plan view, FIG. 14B is a perspective view, FIG. 14C is a cross-sectional view along C-C line in FIG. 14A, FIG. 14D is a cross-sectional view along D-D line in FIG. 14A, FIG. 14E is a cross-sectional view along E-E line in FIG. 14A, FIG. 14F is a cross-sectional view along F-F line in FIG. 14A, and FIG. 14G is a cross-sectional view along G-G line in FIG. 14A.

The upper cover 11 includes the support portion 51 to support the wireless LAN communication module 20 and the regulating portions 52 and 53. The support portion 51 has the screw hole 51a, the regulating surfaces 51x and 51y, and the receiving surface 51z. The screw hole 51a is configured so that the screw 32 can be fastened. The regulating portion 52 has the regulating surfaces 52x and 52y and the receiving surface 52z. The regulating portion 53 has the receiving surface 53z.

Figure 15A:
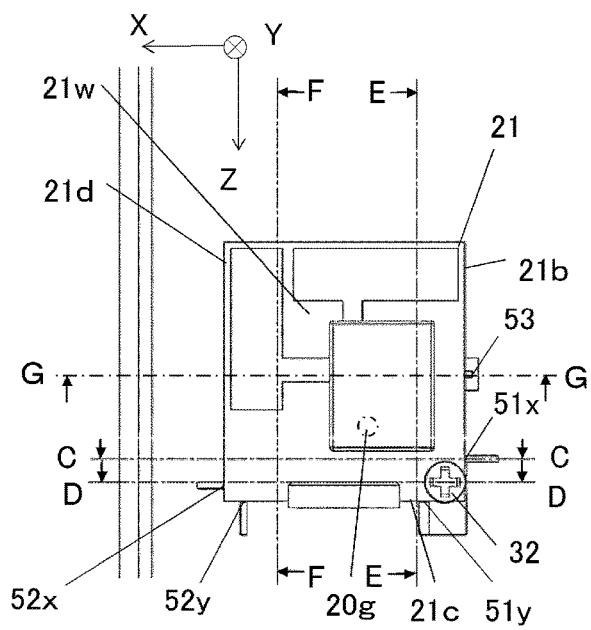
FIGS. 15A to 15G are explanatory diagrams of the upper cover and the wireless LAN communication module in an installed state according to Embodiment 3.
Figure 15B:
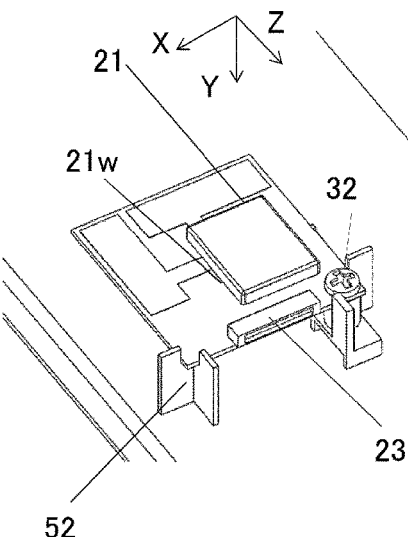
Figure 15C:
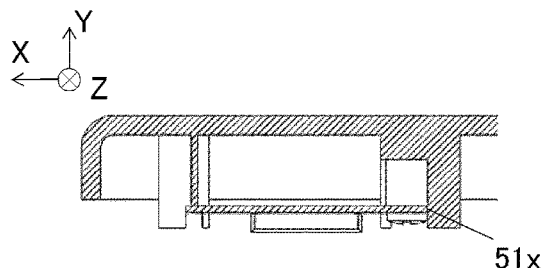
Figure 15D:
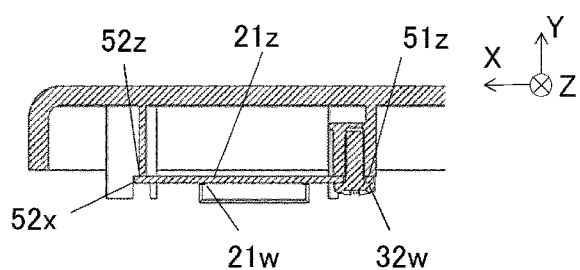
Figure 15E:
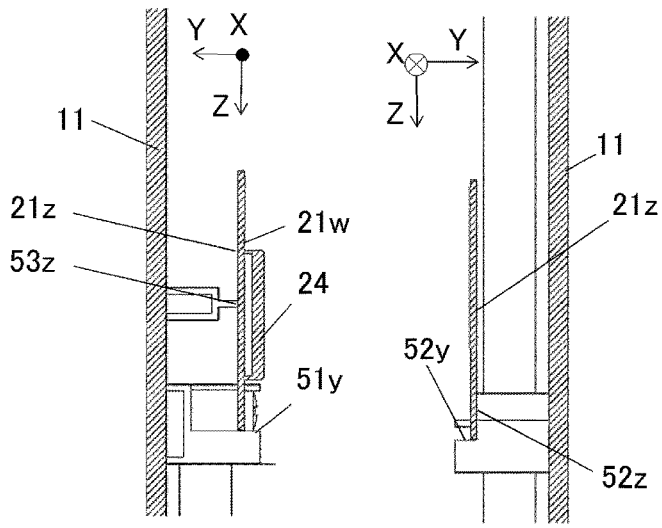
Figure 15F:
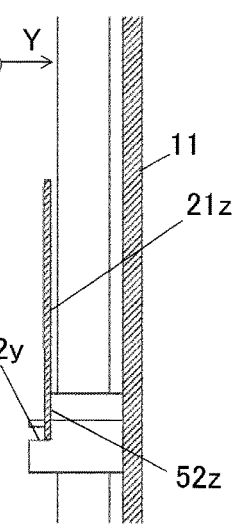
Figure 15G:
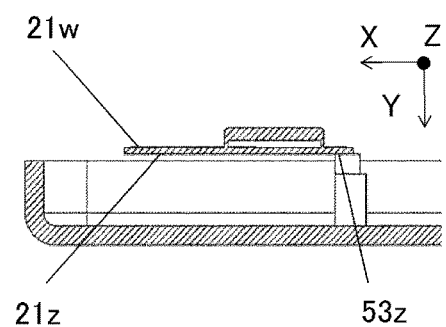
Figure 16:
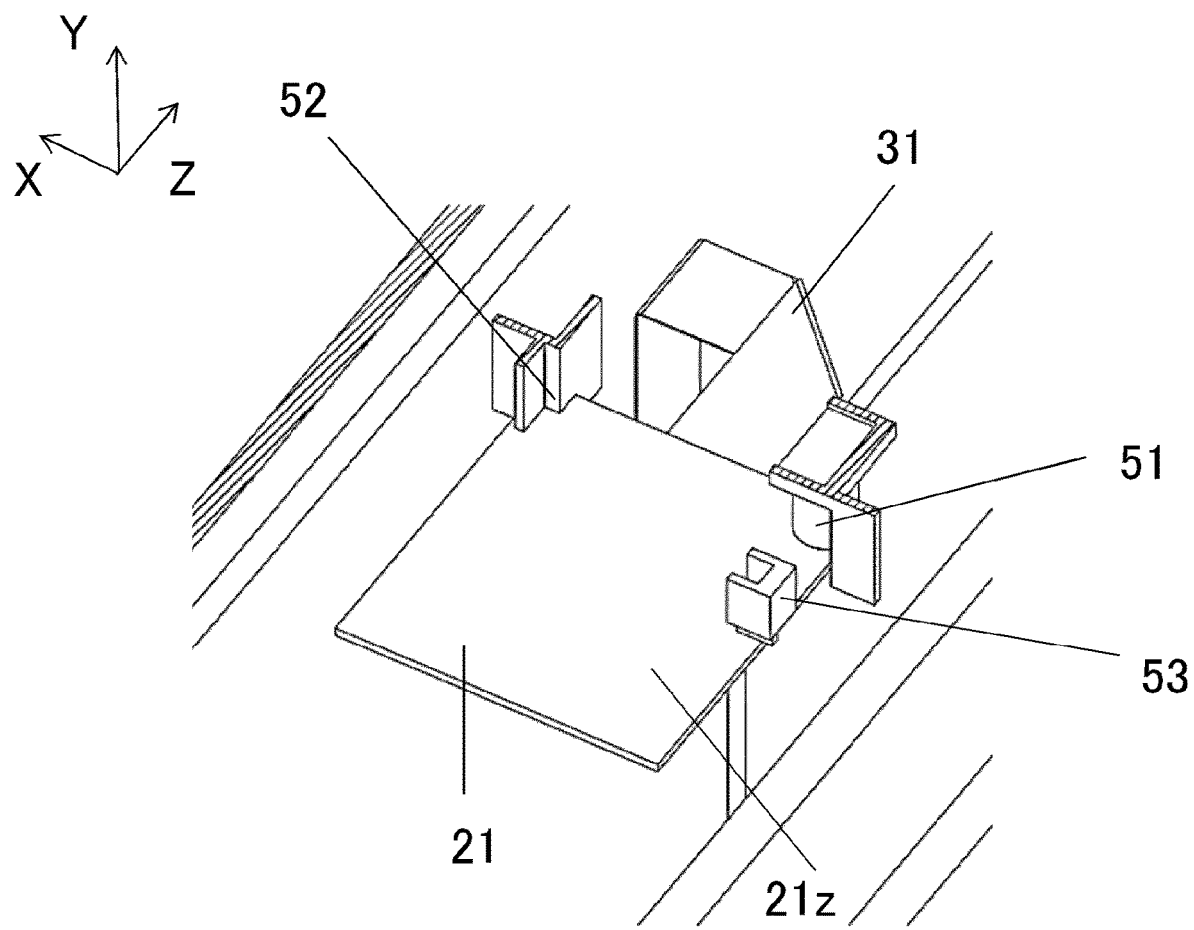
FIG. 16 is a cross-sectional perspective view of the image forming apparatus according to Embodiment 3.

FIGS. 15A to 15G are explanatory diagrams of a state where the wireless LAN communication module 20 according to Embodiment 3 is screwed into the upper cover 11 using the screw 32, and FIG. 16 is a cross-sectional perspective view of the internal configuration of the image forming apparatus 1 in an area near the wireless LAN communication module 20 according to Embodiment 3. FIG. 15A is a plan view, FIG. 15B is a perspective view, FIG. 15C is a cross-sectional view along C-C line in FIG. 15A, FIG. 15D is a cross-sectional view along D-D line in FIG. 15A, FIG. 15E is a cross-sectional view along E-E line in FIG. 15A, FIG. 15F is a cross-sectional view along F-F line in FIG. 15A, and FIG. 15G is a cross-sectional view along G-G line in FIG. 15A.

The regulating surface 51x regulates the end face 21b of the board 21 and the regulating surface 52x regulates the end face 21d of the board 21, whereby the movement of the wireless LAN communication module 20 in the width direction (X direction) of the image forming apparatus 1 is regulated. Further, the regulating surface 51y and the regulating surface 52y regulate the end face 21c of the board 21, whereby the movement of the wireless LAN communication module 20 in the rear direction (+Z direction) of the image forming apparatus 1 is regulated. Furthermore, the receiving surfaces 51z, 52z and 53z regulate the front face 21z of the board 21, and the seat surface 32w of the screw 32 regulates the rear face 21w of the board 21. The front direction (−Z direction) of the image forming apparatus 1 and the rotation direction are not regulated, however when the wireless LAN communication module 20 is assembled on the upper cover 11, the wireless LAN communication module 20 is moved in the rear direction (+Z direction) of the image forming apparatus 1 using a jig or by hand, and the screw 32 is fastened in a state where the end face 21c contacts with the regulating surface 51y and the regulating surface 52y. Thereby the position of the wireless LAN communication module 20 can be stabilized. In this way, the wireless LAN communication module 20 is supported on the upper cover 11.

In order to support the wireless LAN communication module 20 on the upper cover 11, the support portion 51 plays a major role. Specifically, the board 21 is held between the seat surface 32w of the screw 32 and the receiving surface 51z, thereby a frictional force is generated between the seat surface 32w and the rear face 21w of the board 21, and between the receiving surface 51z and the front face 21z of the board 21. By this fictional force, the rotation of the wireless LAN communication module 20 in the horizontal direction and the movement of the wireless LAN communication module 20 in the front-back direction (Z direction) and the width direction (X direction) of the image forming apparatus 1 are regulated. Further movement and the tilting of the wireless LAN communication module 20 in the vertical direction (Y direction) of the image forming apparatus 1 are also regulated by the board 21 being held between the seat surface 32w and the receiving surface 51z. Since the regulating portions 52 and 53 are disposed mainly for stabilization during assembly, the upper cover 11 may include only the support portion 51 without disposing the regulating portions 52 and 53 in a case where, for example, a jig is used for the assembly. As mentioned above, assembly becomes stable if the center of gravity 20g exists in the region surrounded by the receiving surface 51z and the receiving surfaces 52z and 53z. Further, since the shield 24 is disposed close to the end face 21b, the center of gravity 20g is disposed close to the end face 21b, which extends along the end face 21d close to the second antenna 22b. Therefore, the receiving surface 53z can be disposed more distantly from the second antenna 22b, and communication obstructions can be prevented. As described above, by appropriately supporting the wireless LAN communication module 20 at a location distant from the antenna 22a and 22b, an image forming apparatus having good communication performance can be provided.

Embodiment 4

Figure 17:
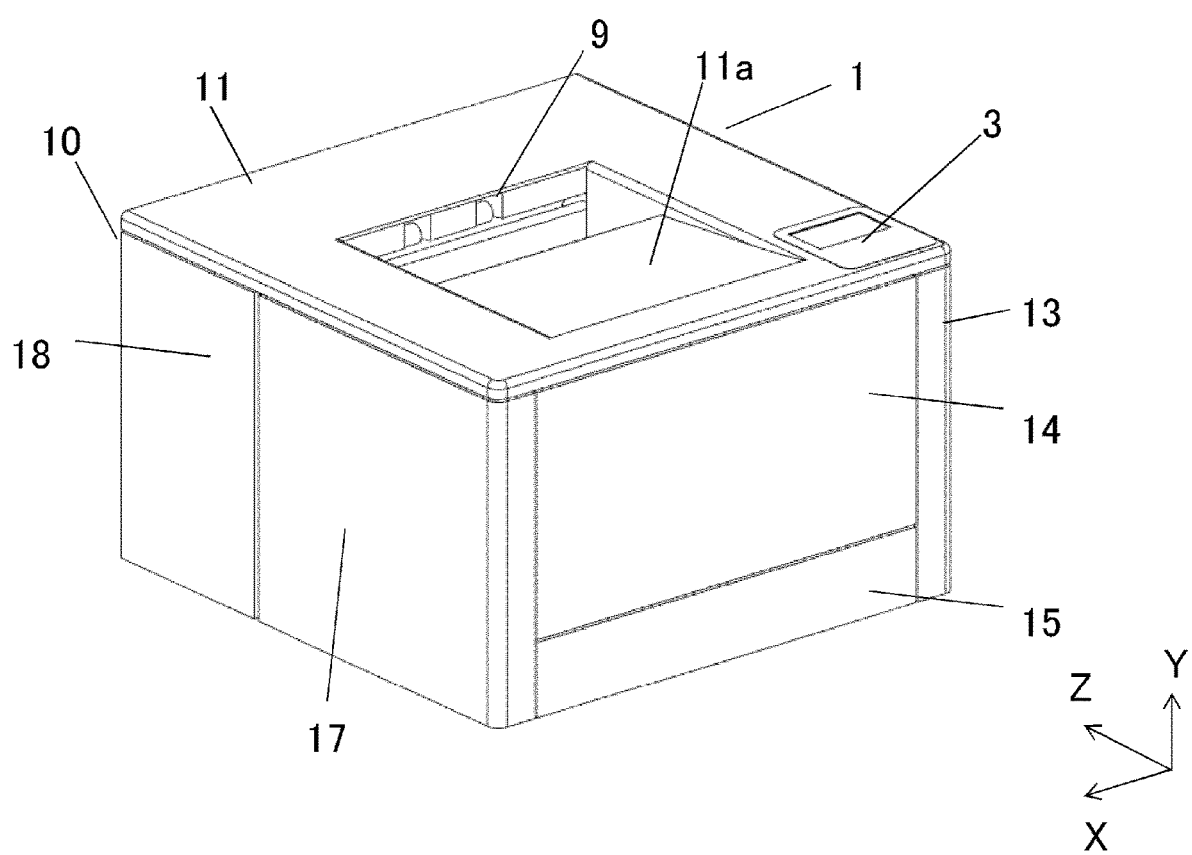
FIG. 17 is a perspective view of an image forming apparatus according to Embodiment 4.

FIG. 17 is a perspective view of a color laser beam printer, which is an example of an image forming apparatus according to Embodiment 4 of the present invention. An outer surface of the image forming apparatus 1 has a plurality of covers 10 made of resin. A left front cover 17 and a left rear cover 18 thereof are side face covers (exterior covers) that cover at least a part of a left side face of the image forming apparatus 1. A front face side of the image forming apparatus 1 is covered by a front door 14 and a cassette cover 15. The front door 14 is supported by the main unit of the image forming apparatus 1 so that it can be opened and closed, allowing such consumables as toner cartridges to be replaced. The cassette cover 15 is fixed to a cassette (not illustrated), and supported by the main unit of the image forming apparatus 1 so that it can be withdrawn, allowing a user to withdraw the cassette and replace paper.

Figure 18:
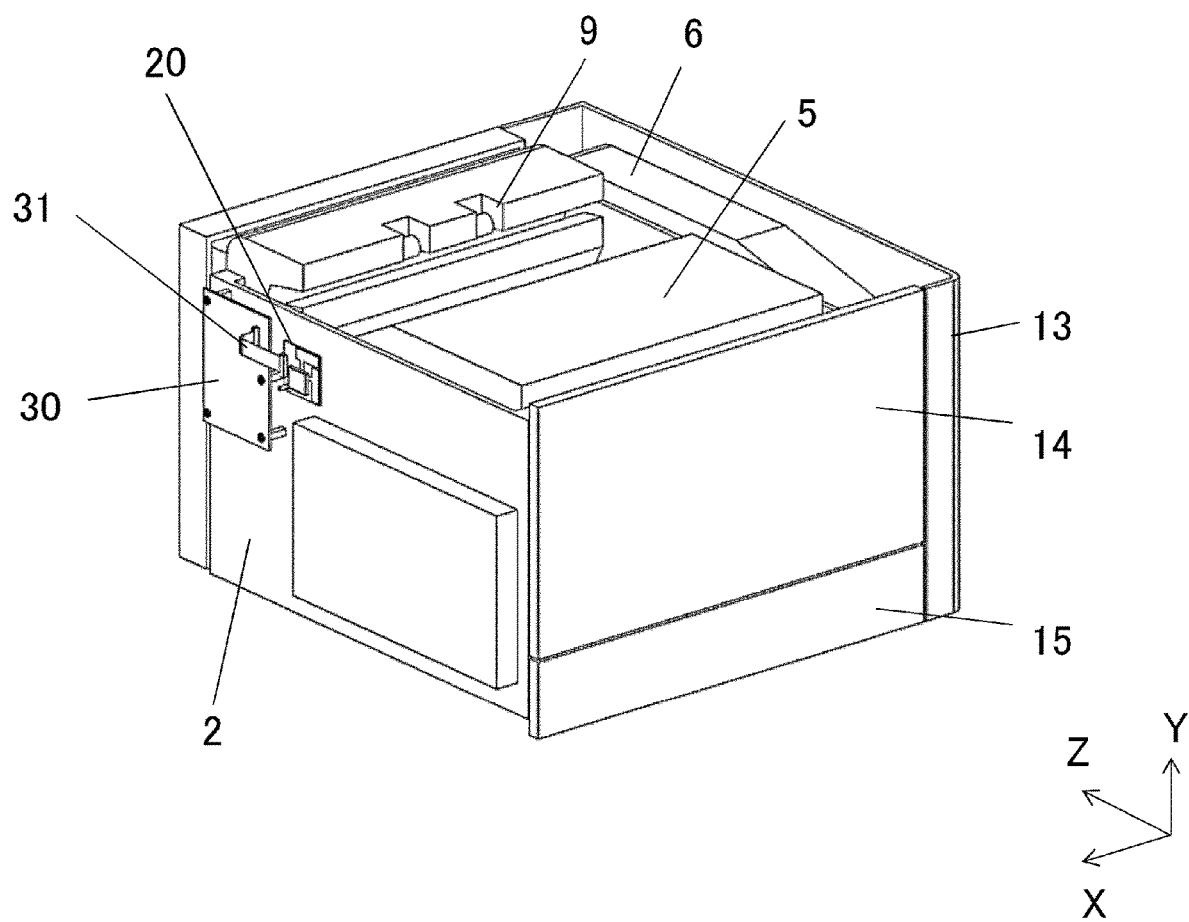
FIG. 18 is a perspective view inside the image forming apparatus according to Embodiment 4.

FIG. 18 is a perspective view inside the image forming apparatus according to Embodiment 4, where the upper cover 11, the left front cover 17 and the left rear cover 18 are not illustrated. A control board 30 is supported by a frame 2, which is a frame of the image forming apparatus 1. A wireless LAN communication module 20 is connected with the control board 30 by an FFC 31, and is supported on the left front cover 17. A drive portion 6 is disposed on the opposite side of the control board 30 across the frame 2, and the fixing/discharging portion 9 configured to fix the image on the paper and discharge the paper, and a laser scanner 5 configured to form a latent image, are disposed within the frame 2.

FIGS. 19A to 19D are explanatory diagrams of a configuration of the wireless LAN communication module 20 according to Embodiment 4, which includes an antenna for wireless LAN communication. FIG. 19A is a plan view of the wireless LAN communication module 20 illustrating a configuration of a mounting surface side of the board 21. FIG. 19B is a perspective view of the wireless LAN communication module 20 illustrating the configuration of the mounting surface side of the board 21. FIG. 19C is a plan view of the wireless LAN communication module 20 illustrating a configuration of a surface on the opposite side of the mounting surface of the board 21. FIG. 19D is a perspective view of the wireless LAN communication module 20 illustrating the configuration of the surface on the opposite side of the mounting surface of the board 21.

The wireless LAN communication module 20 includes the board 21 having mainly electronic circuits, a first antenna 22a, a second antenna 22b, electronic elements (not illustrated), a shield 24 covering the electronic elements, and a connector 23 to connect with the control board 30 via a cable. The board 21 has a rectangular outer shape, and includes a hole 21e. A surface of the board 21 closer to the left front cover 17 is referred to as a front face 21z, and a surface on the opposite side thereof is referred to as a rear face 21w. The first antenna 22a is disposed near an end face 21a constituting an outer form of the board 21, and the second antenna 22b is disposed near an end face 21d constituting the outer form of the board 21. The connector 23 is disposed near an end face 21c, which faces the first antenna 22a across the shield 24. The hole 21e is disposed at a corner where the end face 21c and an end face 21b intersect with each other, the end face 21c being close to the connector 23 and the end face 21b being close to the shield 24. The weight of the wireless LAN communication module 20 is mainly due to the shield 24, the connector 23 and the board 21. When viewed from a plane parallel to the surface of the board 21, a center of gravity 20g of the wireless LAN communication module 20 is closest to the corner where the end face 21b and the end face 21c intersect among the four corners of the board 21.

FIGS. 20A to 20G are explanatory diagrams of the support portion of the wireless LAN communication module 20 of the left front cover 17 according to Embodiment 4. FIG. 20A is a plan view, FIG. 20B is a perspective view, FIG. 20C is a cross-sectional view along C-C line in FIG. 20A, FIG. 20D is a cross-sectional view along D-D line in FIG. 20A, FIG. 20E is a cross-sectional view along E-E line in FIG. 20A, FIG. 20F is a cross-sectional view along F-F line in FIG. 20A, and FIG. 20G is a cross-sectional view along G-G line in FIG. 20A.

The left front cover 17 includes a support portion 51 to support the wireless LAN communication module 20 and a regulating portions 52 and 54. The support portion 51 has a screw hole 51a, regulating surfaces 51x and 51y, and a receiving surface 51z. The screw hole 51a is configured so that a screw 32 can be fastened. The regulating portion 52 has regulating surfaces 52x and 52y and a receiving surface 52z. The regulating portion 54 has a regulating surface 54x, a receiving surface 54z and a hook surface 54w.

Figure 22:
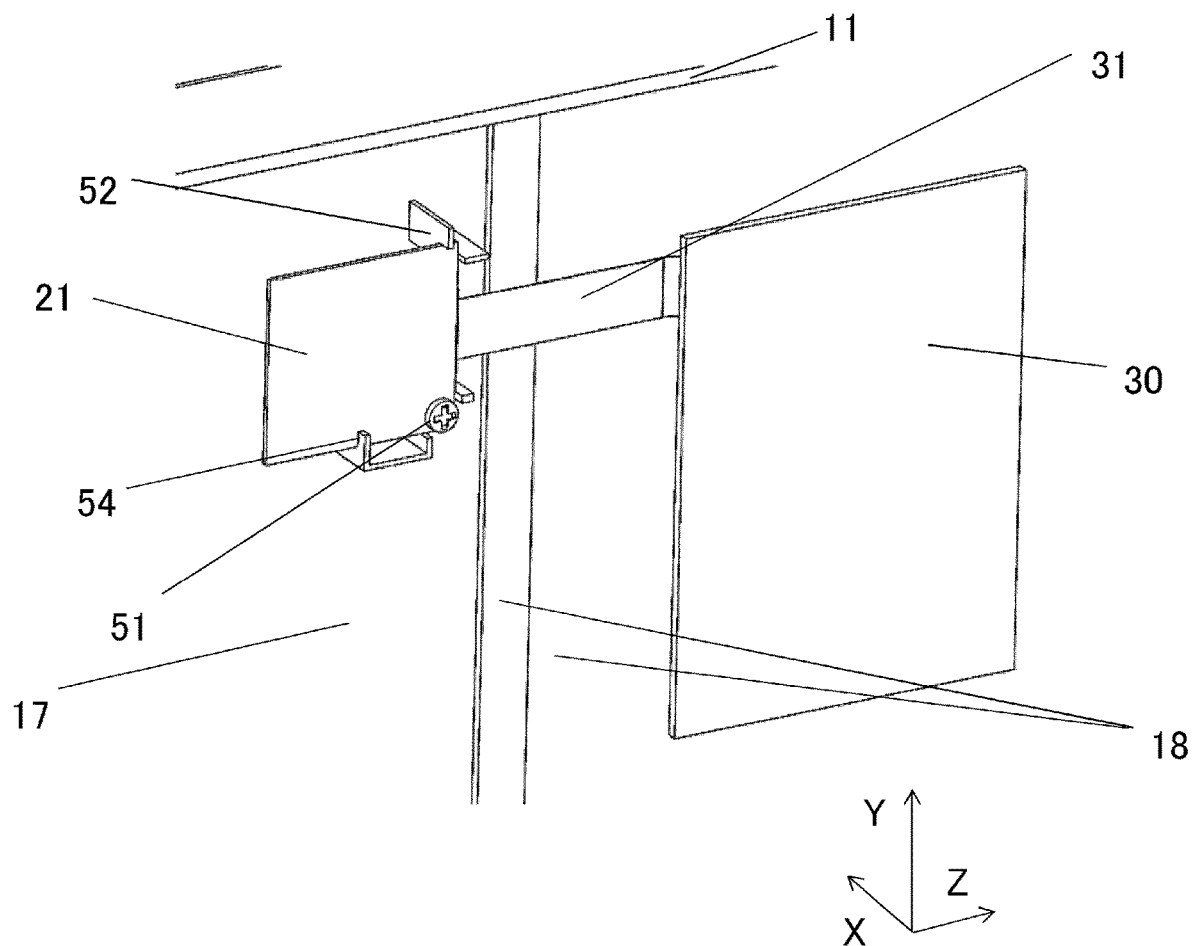
FIG. 22 is a perspective view of an internal configuration of the image forming apparatus according to Embodiment 4.

FIGS. 21A to 21G are explanatory diagrams of a state where the wireless LAN communication module 20 according to Embodiment 4 is screwed into the left front cover 17 using the screw 32, and FIG. 22 is a perspective view when an area near the wireless LAN communication module 20 according to Embodiment 4 is viewed from inside the image forming apparatus 1. FIG. 21A is a plan view, FIG. 21B is a perspective view, FIG. 21C is a cross-sectional view along C-C line in FIG. 21A, FIG. 21D is a cross-sectional view along D-D line in FIG. 21A, FIG. 21E is a cross-sectional view along E-E line in FIG. 21A, FIG. 21F is a cross-sectional view along F-F line in FIG. 21A, and FIG. 21G is a cross-sectional view along G-G line in FIG. 21A.

The regulating surface 51x and the regulating surface 54x regulate the end face 21b of the board 21, and the regulating surface 52x regulates the end face 21d of the board 21, whereby rotation and movement in a vertical direction (Y direction) of the wireless LAN communication module 20 are regulated. The regulating surfaces 51y and 52y regulate the end face 21c of the board 21, whereby the rear direction (+Z direction) of the image forming apparatus 1 of the wireless LAN communication module 20 is regulated. Furthermore, the receiving surfaces 51z, 52z and 54z regulate the front face 21z of the board 21, and the seat surface 32w of the screw 32 and the hook surface 54w of the regulating portion 54 regulate the rear face 21w of the board 21. In this way, the wireless LAN communication module 20 is supported on the left front cover 17.

In order to support the wireless LAN communication module 20 on the left front cover 17, the support portion 51 plays a major role. Specifically, the board 21 is held between the seat surface 32w of the screw 32 and the receiving surface 51z, whereby a frictional force is generated between the seat surface 32w and the rear face 21w of the board 21, and between the receiving surface 51z and the front face 21z of the board 21. By this frictional force, the rotation of the wireless LAN communication module 20 in the horizontal direction and the movement of the wireless LAN communication module 20 in the front-back direction (Z direction) and the vertical direction (Y direction) of the image forming apparatus 1 are regulated. Further, the movement and the tilting of the wireless LAN communication module 20 in the width direction (X direction) of the image forming apparatus 1 are also regulated by the board 21 being held between the seat surface 32w and the receiving surface 51z.

Finally, a method of assembling the wireless LAN communication module 20 according to Embodiment 4 will be described. The left front cover 17 and the wireless LAN communication module 20 are first secured, and are then installed in the image forming apparatus main unit in this state, where the wireless LAN communication module 20 is installed in the left front cover 17. Then the wireless LAN communication module 20 and the control board 30 are connected by the FFC 31, and are installed on the left rear cover 18. By this configuration, the wireless LAN communication module 20 can be installed on a cover on the same side as the control board 30. As described above, by appropriately supporting the wireless LAN communication module 20 at a location distant from the antenna 22, an image forming apparatus having good communication performance can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-126656, filed on Aug. 2, 2021, which is hereby incorporated by reference herein in its entirety.

What is claimed is:

1. An image forming apparatus, comprising:
an apparatus frame;
an exterior cover configured to cover the apparatus frame;
a wireless communication module including an antenna for wireless communication and a board on which the antenna is mounted, and disposed between the apparatus frame and the exterior cover; and
a fixing unit configured to fix the wireless communication module to the exterior cover, and including a screw screwed into a screw hole disposed on the exterior cover via a hole disposed on the board,
wherein, when viewed in a direction perpendicular to a mounting surface of the board on which the antenna is mounted, the antenna and the hole are disposed between a first side constituting a part of an outer form of the board and a second side that extends along the first side, the antenna is disposed at a position closer to the first side than to the second side, and the hole is disposed at a position closer to the second side than to the first side.

2. The image forming apparatus according to claim 1, wherein
the first side and the second side are parallel, and
in a first direction orthogonal to both the first side and the second side, the hole is disposed at a position closer to the second side than to a center of gravity of the board in a state where the antenna is mounted thereon.

3. The image forming apparatus according to claim 2, wherein a third side and a fourth side of the board extend in the first direction, and in a second direction orthogonal to both the third side and the fourth side,
the third side of the board is closer to the center of gravity than the fourth side of the board, and
the hole is disposed near the third side of the board and is disposed at a position closer to the third side than to the center of gravity.

4. The image forming apparatus according to claim 3, wherein
the fixing unit further includes:
a first regulating portion configured to contact the second side in the first direction, in a vicinity of a first corner between the second side and the third side of the board; and
a second regulating portion configured to contact the third side in the second direction in the vicinity of the first corner.

5. The image forming apparatus according to claim 4, wherein
the fixing unit further includes:
a third regulating portion configured to contact the fourth side in the second direction in a vicinity of a second corner between the second side and the fourth side of the board;
a notch recessed in the second direction and disposed on an end face of the fourth side of the board at a position closer to the first side than the third regulating portion;
a fourth regulating portion disposed on the exterior cover and engaged with the notch; and
a fifth regulating portion configured to contact the third side of the board in the second direction at a position closer to the first side than the second regulating portion.

6. The image forming apparatus according to claim 5, wherein
assuming that the board is separated into regions by an imaginary line connecting the position at which the fourth regulating portion contacts the board and the position at which the fifth regulating portion contacts the board in a plan view of the board, the center of gravity exists in a region which includes the second side among the regions.

7. The image forming apparatus according to claim 6, wherein
the notch is disposed at a position more distant from the antenna than the position of the board at which the fifth regulating portion contacts in the first direction.

8. The image forming apparatus according to claim 2, wherein
a third side and a fourth side of the board extend in the first direction,
the hole is disposed in a first corner of the board between the second side and the third side, and
the fixing unit further includes:
a second hole disposed in a second corner of the board between the second side and the fourth side; and
a boss configured to fit in the second hole and disposed in the exterior cover.

9. The image forming apparatus according to claim 3, wherein
the wireless communication module further includes a second antenna for wireless communication disposed at a position different from the antenna, and
the second antenna is mounted near the fourth side.

10. The image forming apparatus according to claim 2, further comprising a control board configured to control an operation of the image forming apparatus, wherein the board has a connector near the second side of the board, the connector being configured to connect the control board and the wireless communication module via a cable.

11. The image forming apparatus according to claim 2, wherein the board includes electronic elements which are mounted between the hole and the antenna; and a shield which covers the electronic elements.

12. The image forming apparatus according to claim 2, wherein the exterior cover is a top cover which covers a top face of the apparatus frame.

13. The image forming apparatus according to claim 2, wherein the exterior cover is a side cover which covers a side face of the apparatus frame.

14. The image forming apparatus according to claim 2, wherein assuming that the board is separated into four regions by bisectors of horizontal sides and vertical sides in the plan view, the center of gravity and the hole exist in a same region among the regions.

\* \* \* \* \*